US011625002B2

(12) United States Patent
Hong et al.

(10) Patent No.: US 11,625,002 B2
(45) Date of Patent: Apr. 11, 2023

(54) MACHINE LEARNING HOLOGRAPHY FOR PARTICLE FIELD IMAGING

(71) Applicant: Regents of the University of Minnesota, Minneapolis, MN (US)

(72) Inventors: Jiarong Hong, New Brighton, MN (US); Siyao Shao, Minneapolis, MN (US); Kevin Mallery, St Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 164 days.

(21) Appl. No.: 17/248,584

(22) Filed: Jan. 29, 2021

(65) Prior Publication Data

US 2021/0232091 A1 Jul. 29, 2021

Related U.S. Application Data

(60) Provisional application No. 62/967,330, filed on Jan. 29, 2020.

(51) Int. Cl.
*G03H 1/04* (2006.01)
*G06N 3/04* (2006.01)
(Continued)

(52) U.S. Cl.
CPC ......... *G03H 1/0443* (2013.01); *G06N 3/0454* (2013.01); *G06T 7/11* (2017.01);
(Continued)

(58) Field of Classification Search
CPC ............. G03H 1/0443; G03H 2210/30; G03H 2210/55; G03H 2210/56;
(Continued)

(56) References Cited

U.S. PATENT DOCUMENTS 10,222,315 B2 3/2019 Grier et al.
2021/0209337 A1\* 7/2021 Ozcan ................ G01N 15/1475
(Continued)

OTHER PUBLICATIONS

Tian et al., "Quantitative measurement of size and three-dimensional position of fast-moving bubbles in air-water mixture flows using digital holography," Research Gate, Applied Optics, vol. 49, No. 9, DOI: 10.1364/AO.49.001549, Mar. 2010, pp. 1549-1554.

(Continued)

*Primary Examiner* — Boubacar Abdou Tchoussou
(74) *Attorney, Agent, or Firm* — Shumaker & Sieffert, P.A.

(57) ABSTRACT

A method comprises obtaining input data comprising a hologram of a 3-dimensional (3D) particle field, a depth map of the 3D particle field, and a maximum phase projection of the 3D particle field. The method also comprises applying a U-net convolutional neural network (CNN) to the input data to generate output data. Encoder blocks have residual connections between a first layer and a second layer that skips over a convolution layer of the encoder block. Decoder blocks have residual connections between a first layer and a second layer that skips over a convolution layer of the decoder block. The output data includes a channel in which pixel intensity corresponds to relative depth of particles in the 3D particle field and an output image indicating locations of centroids of the particles in the 3D particle field.

20 Claims, 7 Drawing Sheets

(51) Int. Cl.
  *G06T 7/50* (2017.01)
  *G06T 7/70* (2017.01)
  *G06T 7/60* (2017.01)
  *G06T 7/11* (2017.01)

(52) U.S. Cl.
  CPC .................. *G06T 7/50* (2017.01); *G06T 7/60* (2013.01); *G06T 7/70* (2017.01); *G03H 2210/30* (2013.01); *G03H 2210/55* (2013.01); *G03H 2210/56* (2013.01); *G06T 2207/10028* (2013.01); *G06T 2207/20081* (2013.01); *G06T 2207/20084* (2013.01)

(58) Field of Classification Search
  CPC ......... G03H 2001/0038; G03H 1/0808; G03H 1/0866; G06N 3/0454; G06N 3/0481; G06N 3/084; G06T 7/11; G06T 7/50; G06T 7/60; G06T 7/70; G06T 2207/10028; G06T 2207/20084; G01N 2015/0233; G01N 2015/0294; G01N 2015/1493; G01N 2015/1497; G01N 15/0227; G01N 2015/1454; G01N 15/1429; G01N 15/1463; G01N 15/1475
  See application file for complete search history.

(56) References Cited

U.S. PATENT DOCUMENTS

2021/0326690 A1* 10/2021 Pégard .................. G06N 3/0675
2022/0012850 A1* 1/2022 Ozcan ....................... G06T 7/50

OTHER PUBLICATIONS

Sentis et al., "Bubbles, drops, and solid particles recognition from real or virtual photonic jets reconstructed by digital in-line holography," Research Gate, Optics Letters, vol. 43, No. 12, DOI: 10.1364/OL.43.002945, Jun. 2018, pp. 2945-2948.
Talapatra et al., "Application of in-situ digital holography in the study of particles, organisms and bubbles within their natural environment," Ocean Sensing and Monitoring IV, vol. 8372, No. 837205 ,https://doi.org/10.1117/12.920570, Jun. 12, 2012, 17 pp.
Li et al., "Size Distribution and Dispersion of Droplets Generated by Impingement of Breaking Waves on Oil Slicks," AGU Publications, Journal of Geophysical Research: Oceans, vol. 122, No. 10, https://doi. org/10.1002/2017JC013193, Jun. 12, 2017, pp. 7938-7957.
Shao et al., "A hybrid image processing method for measuring 3D bubble distribution using digital inline holography," Research Gate, Chemical Engineering Science, vol. 207, No. 7, DOI:10.1016/j.ces.2019.07.009, Jul. 2019, 39 pp.
Ilonen et al., "Comparison of bubble detectors and size distribution estimators," ELSEVIER, Science Direct, Pattern Recognition Letters, vol. 101, Nov. 2017, pp. 60-66.
Ren et al., "Learning-based nonparametric autofocusing for digital holography," Optical Society of America, Optica, vol. 5, No. 4, Apr. 2018, pp. 337-344.
Latychevskaia et al., "Practical algorithms for simulation and reconstruction of digital in-line holograms," Optical Society of America, Applied Optics, vol. 54, No. 9, Mar. 20, 2015, pp. 2424-2434.
Kingma et al., "Adam: A Method for Stochastic Optimization," Machine Learning, axXiv: 1412,6980, sumitted Dec. 22, 2014, 15 pp.
Karn et al., "An integrative image measurement technique for dense bubbly flows with a wide size distribution," Research Direct, ELSEVIER, Science Direct, Chemical Engineering Science, vol. 112, http://dx.doi.org/10.1016/j.ces.2014.09.036, Jan. 2015, pp. 240-249.
Shimobaba et al., "Digital holographic particle volume reconstruction using a deep neural network," Image and Video Processing, accessed from arXiv: 1911.00805, submitted Oct. 21, 2018, 9pp.
Ronneberger et al., "U-Net: Convolutional Networks for Biomedical Image Segmentation," Springer, Medical Image Computing and Computer-Assisted Intervention, Germany, Arxiv, accessed from https://arxiv.org/pdf/1505.04597.pdf, May 18, 2015, pp. 234-241.
Li et al., "Machine learning shadowgraph for particle size and shape characterization," IOP Publishing, Measurement Science and Technology, vol. 32, https://doi.org/10.1088/1361-6501/abae90, Oct. 28, 2020, 9 pp.
Ekvall et al., "Three-Dimensional Tracking of Small Aquatic Organisms Using Fluorescent Nanoparticles," PLOS One, vol. 8, Issue 11, e78498, Nov. 2013, 8 pp.
Batenburg et al., "3D imaging of nanomaterials by discrete tomography," Elsevier, Science Direct, Ultramicroscopy, vol. 109, doi:10.1016/j.ultramic.2009.01.009, Jan. 20, 2009, pp. 730-740.
Prevedel et al., "Simultaneous whole-animal 3D-imaging of neuronal activity using light-field microscopy," PMC, HHS Public Access, Nature Methods, vol. 11, No. 7, doi: 10.1038/nmeth.2964, May 18, 2014, pp. 727-730.
Kumar et al., "3D Holographic Observatory for Long-term Monitoring of Complex Behaviors in *Drosophila*," Scientific Reports, vol. 6, DOI: 10.1038/srep33001, Sep. 8, 2016, 7 pp.
Adams et al., "Single-frame 3D fluorescence microscopy with ultraminiature lensless FlatScope," Science Advances, vol. 3, e1701548, Dec. 8, 2017, 9 pp.
Su et al., "High-throughput lensfree 3D tracking of human sperms reveals rare statistics of helical trajectories," PNAS, vol. 109, No. 40, doi:10.1073/pnas.1212506109/-/DCSupplemental, Oct. 2, 2012, pp. 16018-16022.
Taute et al., "High-throughput 3D tracking of bacteria on a standard phase contracts microscope," Macmillan Publishers Limited, Nature Communications, vol. 6, DOI: 10.1038/ncomms9776, Nov. 2, 2015, pp. 9.
Malkiel et al., "Measurements of plankton distribution in the ocean using submersible holography," Measurement Science and Technology, vol. 10, PII: S0957-0233(99)08403-9, Oct. 19, 1999, pp. 1142-1152.
Sun et al., "In-line digital video holography for the study of erosion processes in sediments," Institute of Physics Publishing, Measurement Science and Technology, vol. 13, Sep. 4, 2002, pp. L7-L12.
Beals et al., "Holographic measurements of inhomogeneous cloud mixing at the centimeter scale," Science Mag, vol. 350, Issue 6556, Oct. 2, 2015, pp. 87-90.
Lindensmith et al., "A Submersible, Off-Axis Holographic Microscope for Detection of Microbial Motility and Morphology in Aqueous and Icy Environments," PLOS One, vol. 11, e0147700, Jan. 26, 2016, 24 pp.
Shao et al., "Machine Learning Holography for 3D Particle Field Imaging," Annual Review of Fluid Mechanics, vol. 42, 2010, (Applicant points out, in accordance with MPEP 609.04(a), that the year of publication, 2010, is sufficiently earlier than the effective U.S. filing date, so that the particular month of publication is not in issue.) pp. 513-555.
Sheng et al., "Buffer layer structures associated with extreme wall stress events in a smooth wall turbulent boundary layer," Journal of Fluid Mechanics, vol. 633, DOI: 10.1017/s0022112009006934, Feb. 28, 2009, pp. 17-70.
Malek et al., "Digital in-line holography: influence of the shadow density on particle field extraction," Optical Society of America, Optics Express, vol. 12, No. 10, May 17, 2004, pp. 2270-2279.
Gao et al., "Self-calibrated microscopic dual-view tomographic holography for 3D flow measurements," Optical Society of America, Optics Express, vol. 26, No. 13, https://doi.org/10.1364/OE.26.016708, Jun. 2018, pp. 16708-16725.
Latychevskaia et al., "Holographic time-resolved particle tracking by means of three-dimensional volumetric deconvolution," Optical Society of America, Optics Express, 20994, vol. 22, No. 17, DOI:10.1364/OE.22.020994, Aug. 25, 2014, 10 pp.
Toloui et al., "High fidelity digital inline holographic method for 3D flow measurements," Optical Society of America, Optics Express, 27159, vol. 23, No. 21, DOI: 10.1364/OE.23.027159, Oct. 19, 2015, 15 pp.
Verrier et al., "Improvement of the size estimation of 3D tracked droplets using digital in-line holography with join estimation recon-

(56) References Cited

OTHER PUBLICATIONS struction," IOP Publishing, Measurement Science and Technology, vol. 27, 045001, 10.1088/0957-0233/27/4/045001 hal-01226210v2, Feb. 23, 2016, 16 pp.

Berdeu et al., "Reconstruction of in-line holograms: combining model-based and regularized inversion," Optical Society of America, Optics Express, 14951, vol. 27, No. 10, https://doi.org/10.1364/OE.27.014951, May 8, 2019, 18 pp.

Jolivet et al., "Regularized reconstruction of absorbing and phase objects from a single in-line hologram, application to fluid mechanics and micro-biology," Optical Society of America, Optics Express, 8923, vol. 26, No. 7, https://doi.org/10.1364/OE.26.008923, Mar. 28, 2018, 18 pp.

Mallery et al., "Regularized inverse holographic volume reconstruction for 3D particle tracking," Optical Society of America, Optics Express, 18069, vol. 27, No. 13, https://doi.org/10.1364/OE.27.018069, Jun. 13, 2019, 16 pp.

Barbastathis et al., "On the use of deep learning for computational imaging," Optical Society of America, Optica, vol. 6, No. 8, https://doi.org/10.1364/OPTICA.6.000921, Jul. 25, 2019, pp. 921-943.

Rivenson et al., "Phase recovery and holographic image reconstruction using deep learning in neural networks," Official Journal of the CIOMP, Light: Science & Applications, vol. 7, 17141, doi:10.1038/lsa.2017.141, Feb. 23, 2018, 9 pp.

Wu et al., "Extended depth-of-field in holographic imaging using deep-learning-based autofocusing and phase recovery," Optical Society of America, Optica, vol. 5, No. 6, https://doi.org/10.1364/OPTICA.5.000704, May 29, 2018, pp. 704-710.

Wang et al., "eHoloNet: a learning-based end-to-end approach for in-line digital holographic reconstruction," Optical Society of America, Optics Express, vol. 26, No. 18, https://doi.org/10.1364/OE.26.022603, Aug. 20, 2018, 12 pp.

Liu et al., "Deep learning-based super-resolution in coherent imaging systems," Scientific Reports, vol. 9, 3926, https://doi.org/10.1038/s41598-019-40554-1, Mar. 8, 2019, 13 pp.

Liu et al., "Deep learning-based color holographic microscopy," Arxiv, Journal of Biophotonics, vol. 12, No. 11, DOI:10.1002/jbio.201900107, accessed from https://arxiv.org/ftp/arxiv/papers/1907/1907.06727.pdf, Jul. 2019, 25 pp.

Gorocs et al., "A deep learning-enabled portable imaging flow cytometer for cost-effective, high-throughput, and label-free analysis of natural water samples," Official Journal of CIOMP, Light: Science & Applications, vol. 7, No. 66, DOI 10.1038/s41377-018-0067-0, Sep. 19, 2018, 12 pp.

Stanier et al., "Ambient aerosol size distributions and number concentrations measured during the Pittsburgh Air Quality Study (PAQS)," ELSEVIER, Atmospheric Environment, vol. 38, No. 10, doi:10.1016/j.atmosenv.2004.03.020, Jun. 2004, pp. 3275-3284.

Hannel et al., "Machine-learning techniques for fast and accurate feature localization in holograms of colloidal particles," Optical Society of America, Optics Express, 15222, vol. 26, No. 12, https://doi.org/10.1364/OE.26.015221, May 31, 2018, 11 pp.

Jaferzadeh et al., "No-search focus prediction at the single cell level in digital holographic imaging with deep convolutional neural network," Optical Society of America, Biomedical Optics Express, vol. 10, No. 8, https://doi.org/10.1364/BOE.10.004276, Jul. 31, 2019, pp. 4276-4289.

Ding et al., "R1-PCA: Rotational Invariant L1-norm Principal Component Analysis for Robust Subspace Factorization," Proceedings of the 23rd International Conference on Machine Learning, Pittsburgh, (Applicant points out, in accordance with MPEP 609.04(a), that the year of publication, 2006, is sufficiently earlier than the effective U.S. filing date, so that the particular month of publication is not in issue.), 2006, 8 pp.

Ralston et al., "Interferometric synthetic aperture microscopy," NIH Public Access, Nature Physics, vol. 3, No. 2, doi:10.1038/nphys514, Feb. 1, 2007, pp. 129-134.

Hall et al., "Uncertainty characterization of particle location from refocused plenoptic images," Optical Society of America, Optics Express, 21801, vol. 25, No. 18, https://doi.org/10.1364/OE.25.021801, Aug. 29, 2017, 14 pp.

Lyu et al., "Deep-learning-based ghost imaging," Nature, Scientific Reports, vol. 7, No. 17865, DOI:10.1038/s41598-017-18171-7, Dec. 19, 2017, 6 pp.

Pereira et al., "Microscale 3D flow mapping with uDDPIV," Research Gate, Experiments in Fluids, vol. 42, No. 4, DOI:10.1007/s00348-007-0267-5, Jan. 5, 2007, pp. 589-599.

Roma et al., "Total 3D imaging of phase objects using defocusing microscopy: application to red blood cells," Semantic Scholars, Applied Physics Letters, vol. 104, 251107, https://doi.org/10.1063/1.4884420, Arxiv, accessed from https://arxiv.org/pdf/1404.2968.pdf, Jun. 24, 2014, 7 pp.

Isola et al., "Image-to-Image Translation with Conditional Adversarial Networks," Proc. of the IEEE CVPR 2017—Honolulu, (IEEE, 2017), Arxiv, accessed from https://arxiv.org/pdf/1611.07004.pdf, Nov. 26, 2018, pp. 1125-1134.

Chen et al., "Encoder-Decoder with Atrous Separable Convolution for Semantic Image Segmentation," Proc. of the IEEE CVPR 2018—Salt Lake City, (IEEE, 2018), Arxiv, accessed from https://arxiv.org/pdf/1802.02611.pdf, Aug. 22, 2018, pp. 801-818.

He et al., "Deep Residual Learning for Image Recognition," Proc. of the IEEE CVPR 2016—Las Vegas, (IEEE, 2016), Arxiv, accessed from https://arxiv.org/pdf/1512.03385.pdf, Dec. 10, 2015, pp. 770-778.

Ramachandran et al., "Searching for Activation Functions," Arxiv, accessed from https://arxiv.org/pdf/1710.05941.pdf, Oct. 27, 2017, 13 pp.

Soulez et al., Inverse problem approach in Particle Digital Holography: out-of-field particle detection made possible, Research Gate, Optical Society of America, Journal of the Optical Society of America, vol. 24, No. 12, DOI:10.1364/JOSAA.24.003708, Jan. 2008, pp. 3708-3716.

Huber et al., "Robust Estimation of a Location Parameter," JSTOR, Annals of Mathematical Statistics, vol. 35, No. 1, DOI: 10.1214/aoms/1177703732, Mar. 1964, pp. 73-101.

Chollet, "fchollet / keras," GitHub repository (2015), https://github.com/fchollet/keras, accessed from https://web.archive.org/web/20150522055317/https://github.com/fchollet/keras, accessed on Sep. 14, 2021, 5 pp.

Kumar et al., "Automated Droplet Size Distribution Measurements Using Digital Inline Holography," Journal of Aerosol Science, vol. 137, accessed from https://arxiv.org/abs/1906.09634, Jun. 23, 2019, 17 pp.

Goodfellow et al., "Deep Learning," MIT Press, (Applicant points out, in accordance with MPEP 609.04(a), that the year of publication, 2016, is sufficiently earlier than the effective U.S. filing date, so that the particular month of publication is not in issue.), 2016, 801 pp.

Tremblay et al., "Training Deep Networks with Synthetic Data: Bridging the Reality Gap by Domain Randomization," Proc. of the IEEE CVPR 2018—Salt Lake City, (IEEE, 2018), , Arvix, accessed from https://arxiv.org/pdf/1804.06516.pdf, Apr. 23, 2018, pp. 969-977.

Brucker, "PIV in Two-Phase Flows," Von Karman Institute for Fluid Dynamics, Lecture Series 2000-01 Particle Image Velocimetry and associated techniques, Jan. 17-21, 2000, 28 pp.

Schneider et al., "Fast particle characterization using digital holography and neural networks," Optical Society of America, Applied Optics, vol. 55, No. 1, http://dx.doi.org/10.1364/AO.55.000133, Jan. 1, 2016, pp. 133-139.

Eshel et al., "Critical Evaluation of the Use of Laser Diffraction for Particle-Size Distribution Analysis," Soil Science Society of America, vol. 68, May-Jun. 2004, pp. 736-743.

Frid-Adar et al., "Synthetic Data Augmentation Using Gan for Improved Liver Lesion Classification," In 2018 IEEE 15th international symposium on biomedical imaging (ISBI 2018), Jan. 8, 2018, 5 pp.

(56) References Cited

OTHER PUBLICATIONS

Gao, "Development and Applications of Digital Holography to Particle Field Measurement and In Vivo Biological Imaging," Purdue University Graduate School Thesis/Dissertation Acceptance, Aug. 2014, 184 pp.

Gao et al., "Refinement of particle detection by the hybrid method in digital in-line holography," Optical Society of America, Applied Optics, vol. 53, No. 27, http://dx.doi.org/10.1364/AO.53.00G130, Sep. 20, 2014, pp. G130-G138.

Gil et al., "Emission of pesticides to the air during sprayer application: A bibliographic review," ELSEVIER, Atmospheric Environment, vol. 39, May 25, 2005, pp. 5183-5193.

Karn et al., "An integrative image measurement technique for dense bubbly flows with a wide size distribution," ELSEVIER, Chemical Engineering Science, vol. 122, DOI: 10.1016/j.ces.2014.09.036, Oct. 2, 2014, pp. 240-249.

Sudre et al., "Generalised Dice Overlap as a Deep Learning Loss Function for Highly Unbalanced Segmentations," Deep Learning in Medical Image Analysis and Multimodal Learning for Clinical Decision Support, vol. 2017 doi:10.1007/978-3-319-67558-9_28, Jun. 7, 2021, pp. 240-248.

Wang et al., "Y-Net: a one-to-two deep learning framework for digital holographic reconstruction," Optical Society of America, Optics Letters, vol. 44, No. 19, DOI: 10.1364/OL.44.004765, Oct. 1, 2019, pp. 4765-4768.

Yevick et al., "Machine-learning approach to holographic particle characterization," Optical Society of America, Optics Express, vol. 22, No. 22, Nov. 3, 2014, DOI:10.1364/OE.22.026884, pp. 26884-26890.

Yu et al., "Nanoscale 3D Tracking with Conjugated Polymer Nanoparticles," American Chemical Society, Journal of the American Chemical Society, vol. 131, 10.1021/ja907228q, Nov. 24, 2009, pp. 18410-18414.

Wu et al., "Wavelet-based depth-of-field extension, accurate autofocusing, and particle paring for digital inline particle holography," Optical Society of America, vol. 53, No. 4, http://dx.doi.org/10.1364/AO.53.000556, Feb. 1, 2014, pp. 554-564.

Wang et al., "ECVT Imaging of 3D Spiral Bubble Plume Structures in Gas-Liquid Bubble Columns," The Canadian Journal of Chemical Engineering, vol. 92, Dec. 2014, pp. 2078-2087.

Raffel et al., "Particle Image Velocimetry—a Practical Guide, Third Edition," Springer International Publishing AG, part of Springer Nature 2018, https://doi.org/10.1007/978-3-319-68852-7, (Applicant points out, in accordance with MPEP 609.04(a), that the year of publication, 2018, is sufficiently earlier than the effective U.S. filing date, so that the particular month of publication is not in issue.), 2018, 680 pp.

Mandracchia et al., "Holographic microscope slide in a spatiotemporal imaging modality for reliable 3D cell counting," Royal Society of Chemistry, Lab on a Chip, vol. 17, DOI: 10.1039/c7lc00414a, Jul. 11, 2017, pp. 2831-2838.

Khanam et al., "Accurate size measurement of needle-shaped particles using digital holography," ELSEVIER, Science Direct, Chemical Engineering Science, vol. 66, Mar. 21, 2011, pp. 2699-2706.

Kebbel et al., "Digital holography as a versatile optical diagnostic method for microgravity experiments," IOP Publishing Ltd., Measurement Science and Technology, vol. 10, Jun. 17, 1999, pp. 893-899.

Guildenbecher et al., "Digital holography simulations and experiments to quantify the accuracy of 3D particle location and 2D sizing using a proposed hybrid method," Optical Society of America, Applied Optics, vol. 52, No. 16, http://dx.doi.org/10.1364/AO.52.003790, Jun. 1, 2013, pp. 3790-3801.

Fu et al., "BubGAN: Bubble generative adversarial networks for synthesizing realistic bubbly flow images," ELSEVIER, Science Direct, Chemical Engineering Science, vol. 204, https://doi.org/10.1016/j.ces.2019.04.004, Apr. 9, 2019, pp. 35-47.

Feng et al., "Influence of particle size distribution on minimum fluidization velocity and bed expansion at elevated pressure," ELSEVIER, Science Direct, Powder Technology, vol. 320, http://dx.doi.org/10.1016/j.powtec.2017.07.024, Jul. 8, 2017, pp. 27-36.

Estevadeordal et al., "PIV with LED: Particle Shadow Velocimetry (PSV)," American Institute of Aeronautics and Astronautics, 43rd AIAA aerospace sciences meeting and exhibit, (Applicant points out, in accordance with MPEP 609.04(a), that the year of publication, 2005, is sufficiently earlier than the effective U.S. filing date, so that the particular month of publication is oot in issue.), 2005, 10 pp.

Cicek et al., "3D U-Net: Learning Dense Volumetric Segmentation from Sparse Annotation," Medical Image Computing and Computer-Assisted Intervention, 2016 Germany, SPRINGER, (Applicant points out, in accordance with MPEP 609.04(a), that the year of publication, 2016, is sufficiently earlier than the effective U.S. filing date, so that the particular month of publication is not in issue.), 2016, pp. 424-432.

Choi et al., "Three-dimensional volumetric measurement of red blood cell motion using digital holographic microscopy," Optical Society of America, Applied Optics, vol. 48, No. 16, Jun. 1, 2009, pp. 2983-2290.

Bianco et al., "High-accuracy identification of micro-plastics by holographic microscopy enabled support vector machine," Proceedings of SPIE 10887, Quantitative Phase Imaging V, 108870F, doi: 10.1117/12.2509515, Mar. 4, 2019, 8 pp.

Zhang et al., "Influence of some recording parameters on digital holographic particle image velocimetry," Optical Engineering, vol. 45, No. 7, Jul. 2006, pp. 075801-1-07580-10.

Gonzalez et al., "Digital Image Processing Using Matlab," [Abstract only], 2nd Edition, Gatesmark Publishing, LLC, (Applicant points out, in accordance with MPEP 609.04(a), that the year of publication, 2009, is sufficiently earlier than the effective U.S. filing date, so that the particular month of publication is not in issue.), 2009, 3 pp.

Katz et al., "Applications of Holography in Fluid Mechanics and Particle Dynamics," Annual Reviews, the Annual Review of Fluid Mechanics, vol. 42, DOI: 10.1146/annurev-fluid-121108-145508, Sep. 21, 2009, pp. 531-555.

\* cited by examiner

MACHINE LEARNING HOLOGRAPHY FOR PARTICLE FIELD IMAGING

This application claims the benefit of U.S. Provisional Patent Application 62/967,330, filed Jan. 29, 2020, the entire content of which is incorporated by reference.

GOVERNMENT LICENSE RIGHTS

This invention was made with government support under N00014162755 awarded by the U.S. Office of Naval Research. The government has certain rights in the invention.

TECHNICAL FIELD

This disclosure generally relates to particle field imaging.

BACKGROUND

Particle fields may include bubbles, droplets, aerosols, biological cells, or other small objects. Particle fields are of interest across many scientific and engineering domains. For instance, measurement of particle (e.g., droplets, sediment, bubbles, etc.) size distribution, particle positions and velocities may be critical for understanding multiphase flow dynamics in many engineering applications and fundamental research. Some examples are droplet sprays generated by pesticide sprayers, bubbly flows in a chemical reactor, particle suspensions in fluidized beds, and pollutant transport in the atmosphere.

In the past few decades, three-dimensional (3D) imaging has grown in popularity for measurements of particle size, shape, position, and motion in fields such as fluid dynamics, environmental science, chemical engineering, materials science, biology, medical sciences, and others. Digital holography (DH) has recently emerged as a powerful tool for such imaging tasks and is particularly useful for many in situ applications owing to its simple and compact setup. For instance, DH has emerged as a low-cost and compact tool for measuring particle size distributions, particularly in the regime of multiphase flows with low void fraction dispersed phases such as water droplets in cloud, airborne coal particles, aerosols generated by breaking wave impingement of oil slicks, drifting droplets from sprays, and bubbles in the wake of a ventilated supercavity. DH may also be referred to as "digital inline holography."

DH encodes complex information from the particles (e.g., 3D position and size) onto a 2D image called a hologram by recording the interference between a reference light wave and light scattered from the particles. For instance, DH and other types of holography, including analog holography, may employ a coherent light source (e.g., laser) and a single camera to record an interference pattern (i.e., hologram) generated from the scattered light of an object and the non-scattered portion of the illumination light source. The information can subsequently be recovered from the hologram through a digital reconstruction process. In some instances, the hologram is reconstructed through a digital process and the information (i.e., size and location) of the objects within the hologram is extracted through a segmentation process from the reconstructed optical field.

SUMMARY

In general, the present disclosure describes techniques for particle field imaging and holographic imaging. As described in this disclosure, machine learning holography for three-dimensional (3D) particle field reconstruction uses specially designed convolutional neural networks with components aiming to cope with challenges arising in particle holograms where accurate measurement of individual particles may be important. The proposed techniques have been demonstrated as having certain technical advantages, such as being able to process high-density particle field holograms with significant speed improvements over certain existing techniques. Furthermore, the proposed techniques can be adapted to other types of particle field imaging, particularly for 3D measurements.

High particle concentration and the associated complexity of particle fields are problems for particle field imaging technologies and existing digital hologram processing. Existing techniques, for example, often rely on hardware designed to capture information of a particle field during recording steps but require sophisticated mechanical and optical components. Advanced inverse numerical approaches, such as deconvolution and iterative optimization, are computationally intensive, require expert level tuning of parameters, and do not incorporate dynamic noise characteristics associated with optical distortion and particle cross-interference, which hampers the performance of these methods. Accordingly, existing techniques of conventional hologram processing may be slow and/or computational resource intensive. Further, tuning of multiple parameters in the hologram processing algorithms may require an expert level of knowledge of the hologram processing algorithms.

As described herein, combining specific components such as residual connections, Swish activation function, Huber loss function and mean square error loss function with total variation regularization in a neural network design may improve a training process of a machine learning model used in hologram reconstruction. In other examples, other types of loss functions may be used. The resulting model may avoid ghost particles reconstructed from holograms with simplified post processing procedures. Preprocessing of the holograms before machine learning reconstruction may enhance particle positioning accuracy, especially for high concentration particle fields. The framework of the machine learning technique of this disclosure may be extendable to many types of particle field imaging techniques, particularly for 3D measurements.

Techniques of this disclosure may allow hologram processing with very high-density particle fields in comparison to conventional algorithms. In some instances, the techniques of this disclosure may provide a significant speed improvement. The techniques of this disclosure may provide a software solution for a variety of applications, such as high-resolution real-time monitoring of the flow and particle characteristics in 3D in a variety of applications (e.g., microfluidic devices, bubble flow in chemical reactors, particle suspension in a fluidized bed). The techniques of this disclosure may also be readily extended to process particle images from other types of imaging techniques (e.g., shadowgraphic image, defocusing imaging, light-field imaging, etc.).

In one example, this disclosure describes a method for particle/tracer localization or particle field imaging, the method comprising: obtaining input data, the input data comprising at least one of an original hologram of a 3-dimensional (3D) particle field, a depth map of the 3D particle field, or a maximum phase projection of the 3D particle field; and applying a U-net convolutional neural network (CNN) to the input data to generate output data, wherein: the U-net CNN comprises a set of one or more encoder blocks and a set of one or more decoder blocks, for each respective encoder block of the set of encoder blocks, the respective encoder block has a residual connection between a first layer of the respective encoder block and a second layer of the respective encoder block that skips over a convolution layer of the respective encoder block between the first layer of the respective encoder block and the second layer of the respective encoder block, for each respective decoder block of the set of decoder blocks, the respective decoder block has a residual connection between a first layer of the respective decoder block and a second layer of the respective decoder block that skips over a convolution layer of the respective decoder block between the first layer of the respective decoder block and the second layer of the respective decoder block, output of a last-occurring encoder block of the set of encoder blocks is input to a first-occurring decoder block of the set of decoder blocks, and the output data includes a first output image and a second output image, the first output image comprising a channel in which pixel intensity corresponds to relative depth of particles in the 3D particle field, and the second output image indicating locations of centroids of the particles in the 3D particle field.

In another example, this disclosure describes a method for particle characterization from particle field imaging, the method comprising: obtaining input data, the input data comprising at least one of a hologram of a 3-dimensional (3D) particle field, an image reconstructed from the hologram to a longitudinal location, or a minimum intensity projection in a longitudinal direction from a reconstructed optical field of the hologram; and applying a U-net convolutional neural network (CNN) to the input data to generate output data, wherein: the U-net CNN comprises a set of one or more encoder blocks and a set of one or more decoder blocks, for each respective encoder block of the set of encoder blocks, the respective encoder block has a residual connection between a first layer of the respective encoder block and a second layer of the respective encoder block that skips over a convolution layer of the respective encoder block between the first layer of the respective encoder block and the second layer of the respective encoder block, for each respective decoder block of the set of decoder blocks, the respective decoder block has a residual connection between a first layer of the respective decoder block and a second layer of the respective decoder block that skips over a convolution layer of the respective decoder block between the first layer of the respective decoder block and the second layer of the respective decoder block, output of a last-occurring encoder block of the set of encoder blocks is input to a first-occurring decoder block of the set of decoder blocks, and the output data includes a first output image and a second output image, the first output image comprising a particle size map for particles in the 3D particle field, and the second output image indicating locations of centroids of the particles in the 3D particle field.

In another example, this disclosure describes a system comprising: processing circuitry; and a computer-readable storage medium coupled to the at least one processor, the computer-readable storage medium configured to store instructions that configure the processing circuitry to: obtain input data, the input data comprising at least one of an original hologram of a 3-dimensional (3D) particle field, a depth map of the 3D particle field, or a maximum phase projection of the 3D particle field; and apply a U-net convolutional neural network (CNN) to the input data to generate output data, wherein: the U-net CNN comprises a set of one or more encoder blocks and a set of one or more decoder blocks, for each respective encoder block of the set of encoder blocks, the respective encoder block has a residual connection between a first layer of the respective encoder block and a second layer of the respective encoder block that skips over a convolution layer of the respective encoder block between the first layer of the respective encoder block and the second layer of the respective encoder block, for each respective decoder block of the set of decoder blocks, the respective decoder block has a residual connection between a first layer of the respective decoder block and a second layer of the respective decoder block that skips over a convolution layer of the respective decoder block between the first layer of the respective decoder block and the second layer of the respective decoder block, output of a last-occurring encoder block of the set of encoder blocks is input to a first-occurring decoder block of the set of decoder blocks, and the output data includes a first output image and a second output image, the first output image comprising a channel in which pixel intensity corresponds to relative depth of particles in the 3D particle field, and the second output image indicating locations of centroids of the particles in the 3D particle field.

In another example, this disclosure describes an imaging system comprising: processing circuitry; and a computer-readable storage medium coupled to the at least one processor, the computer-readable storage medium configured to store instructions that configure the processing circuitry to: obtain input data, the input data comprising the hologram, a depth map of the 3D particle field, and a maximum phase projection of the 3D particle field; and apply a U-net convolutional neural network (CNN) to the input data to generate output data, wherein: the U-net CNN comprises a set of one or more encoder blocks and a set of one or more decoder blocks, for each respective encoder block of the set of encoder blocks, the respective encoder block has a residual connection between a first layer of the respective encoder block and a second layer of the respective encoder block that skips over a convolution layer of the respective encoder block between the first layer of the respective encoder block and the second layer of the respective encoder block, for each respective decoder block of the set of decoder blocks, the respective decoder block has a residual connection between a first layer of the respective decoder block and a second layer of the respective decoder block that skips over a convolution layer of the respective decoder block between the first layer of the respective decoder block and the second layer of the respective decoder block, output of a last-occurring encoder block of the set of encoder blocks is input to a first-occurring decoder block of the set of decoder blocks, and the output data includes a first output image and a second output image, the first output image comprising a channel in which pixel intensity corresponds to relative depth of particles in the 3D particle field, and the second output image indicating locations of centroids of the particles in the 3D particle field.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
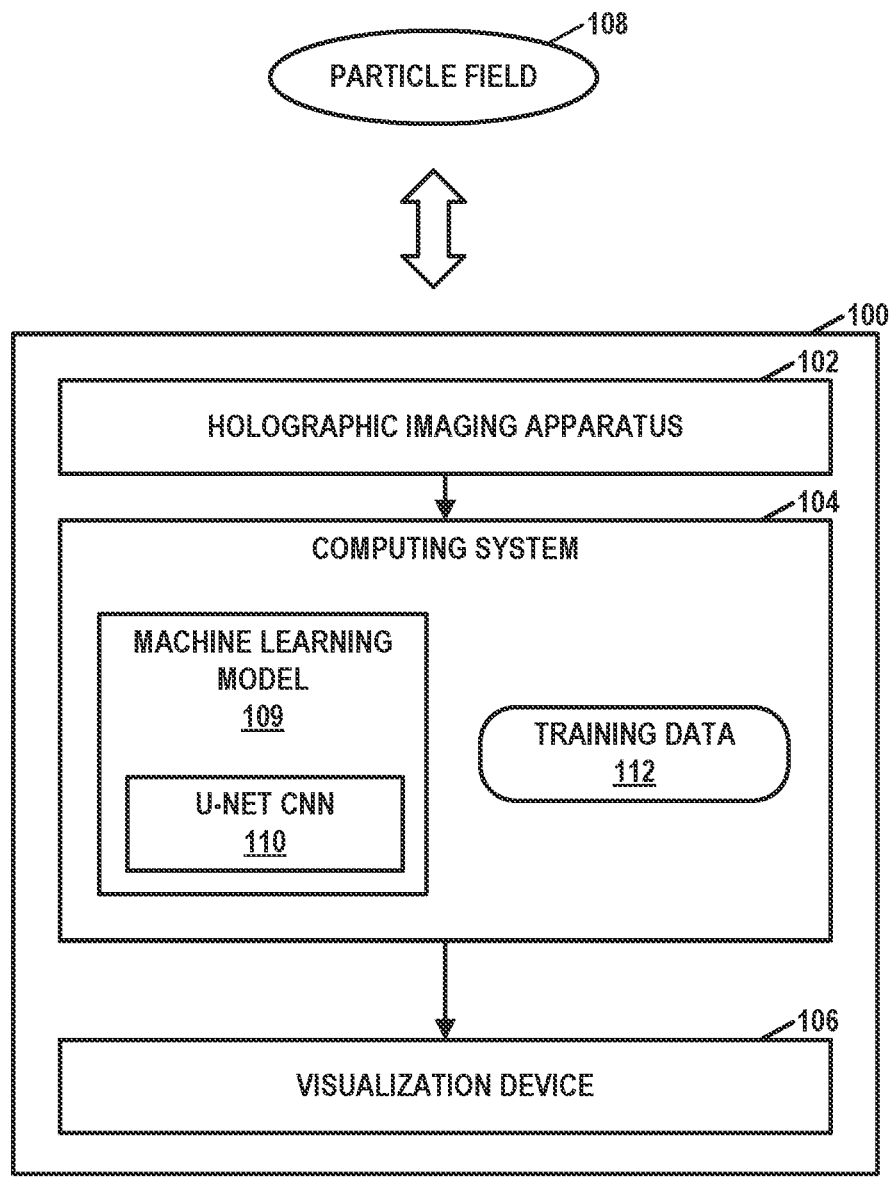
FIG. 1 is a block diagram illustrating an example system in accordance with one or more techniques of this disclosure.

FIG. 1 is a block diagram illustrating an example system 100 in accordance with one or more techniques of this disclosure. System 100 may comprise, or form part of, various types of devices and systems, such as a computing device, a real-time in-situ particle analyzer, a system for 3-dimensional (3D) flow diagnostic flow analysis, a holographic microscope, a total holographic characterization device, mobile and/or wearable computing devices and other types of devices or systems. Example applications of the techniques of this disclosure may include particle characterization (e.g., measuring the size, refractive index, shape, or other aspects of particles), 3D flow diagnostics, microscopic particle tracking, environmental monitoring, and so on. Examples of particle characterization may include determining compositions of unknown particles, spray diagnostics for industrial and agricultural sprayers, spray measurements for combustion research, extensions of applications for which a phase doppler particle analyzer (PDPA) is currently used, and so on. Examples of 3D flow diagnostics may include academic research, applications similar to those currently performed using 3D particle tracking velocimetry (PTV) or particle image velocimetry (NV), and so on. Examples of microscope particle tracking may include academic research into behavior of bacteria or other microorganisms, medical research and diagnosis (e.g., measuring sperm motility for fertility assessment), and so on. Examples of environment monitoring may include aerosol measurements, pollution and smog detection and analysis, precipitation measurement and quantification, and so on.

In the example of FIG. 1, system 100 includes a holographic imaging apparatus 102, a computing system 104, and a visualization device 106. In other examples, system 100 may include more, fewer, or different components. In some examples, components of system 100 may be implemented as one or more devices. In some such examples, components of system 100 may be geographically dispersed. In other examples, components of system 100 may be integrated into a single device or set of devices.

Holographic imaging apparatus 102 generates a hologram of a 3-dimensional particle field 108. Example types of particle fields may include bubbles in a medium, inclusions in a crystal, biological particles, suspended particles, and so on. Computing system 104 may include one or more computing devices, such as personal computers, laptops, servers, cloud-computing platforms, smartphones, tablet computers, special-purpose computers, or other types of devices. In some examples, computing system 104 may be a part or parts of a device that perform processing functions. Computing system 104 may include processing circuits, such as microprocessors, application-specific integrated circuits, field-programmable gate arrays, and so on. Computing system 104 may also include a memory configured to store data, such as the hologram generated by holographic imaging apparatus 102. The memory may be implemented as one or more storage components. The processing circuits of computing system 104 are configured to perform information processing tasks. For ease of explanation, this disclosure may describe information processing tasks performed by the processing circuits of computing system 104 as being performed by computing system 104 itself. For instance, as described herein, computing system 104 may process the hologram and other information to generate output data.

Visualization device 106 may output data generated by computing system 104. Visualization device 106 may include a display screen, such as a monitor, television, touchscreen, and so on. As described herein, example types of output data may include various types of visual content, such as output images representing renderings of 3D particle distributions. As some examples, computing system 104 may generate output data that includes 3D measurement information obtained by application of the techniques described herein, such as information or content based on locations, speed, and trajectory of the particles as determined by the computing system. In some examples, computing system 104 may generate data to include control signals for controlling devices, systems and/or equipment based on the techniques described herein.

Digital holography (DH) has emerged as a powerful tool for imaging tasks involving particle fields. DH may be particularly useful for many in situ applications owing to its relatively simple and compact setup. DH encodes complex information from the particles (e.g., 3D position and size) onto a 2D image called a hologram by recording the interference between a reference light wave and light scattered from the particles. The information can subsequently be recovered from the hologram through a digital reconstruction process.

In comparison to other optical-based particle size measurement techniques such as laser diffraction, light field imaging, and shadowgraphy, DH can provide high resolution measurements of the 3D distributions of particle size and shape with no assumptions about the shape of the particles like laser diffraction. However, a major challenge of DH lies in the segmentation of objects from the optical fields reconstructed from holograms. Several object segmentation approaches have been proposed in the literature. For example, Tian et al, "Quantitative measurement of size and three-dimensional position of fast-moving bubbles in air-water mixture flows using digital holography," Appl. Opt. 49(9), 1549-1554 (2010), described using a minimum intensity metric on the object edge in the holograms to determine the object depth and a Gaussian mixture model to segment individual objects from clusters. The method was used for measuring the size distribution of bubbles in a well-mixed water tank with mostly spherically shaped bubbles. A similar approach was adopted by Sentis et al, "Bubbles, drops, and solid particles recognition from real or virtual photonic jets reconstructed by digital in-line holography," Opt. Lett. 43(12), 2945-2948 (2018), for measuring a mixture of diluted bubbles and oil droplets rising in a quiescent water tank. Sentis showed that the bubbles and oil droplets could be discriminated from holograms based on their intensity signatures. However, the performance of the minimum intensity metric is hampered by increasing complexity of the particle field due to increasing particle concentrations and wider ranges of particle sizes. The depth of particles can also be determined through quantification of the level of particle focus. For example, Gao, J., "Development and applications of digital holography to particle field measurement and in vivo biological imaging," PhD diss., Purdue University (2014), used the pixel intensity gradient to quantify sharpness of the particle edge (which determines the particle depth), and measured particle size using the minimum intensity metric. The method of Gao has been employed in various applications such as measurements of spherical solid particles in quiescent flow and spray measurements in a wind tunnel. Furthermore, Wu et al, "Wavelet-based depth-of-field extension, accurate autofocusing, and particle pairing for digital inline particle holography," Appl. Opt. 53(4), 556-564 (2014), applied a wavelet filter to the reconstructed optical field and used the resultant filtered image as the focus metric. Wu conducted the 3D measurement of irregularly shaped coal particles in the air. Nevertheless, these types of measurement may be only suitable for particles with large sizes relative to the sensor resolution and their performances are susceptible to the noise in holograms such as the virtual image near particle edges.

Additional particle shape segmentation criterion is often adopted to improve the accuracy of segmentation and localization of the particles from holograms. For example, Talapatra et al, "Application of in-situ digital holography in the study of particles, organisms and bubbles within their natural environment," Ocean Sensing and Monitoring IV (2012), assumed spherical shape in the segmentation and determined the depths of particles based on the pixel intensity gradient calculated from a Sobel filter. Using this approach, Talapatra conducted a measurement of bubble size distribution in a ship wake using holograms captured by a DH setup towed by the ship and Li et al, "Size distribution and dispersion of droplets generated by impingement of breaking waves on oil slicks," J. Geophys. Res. Oceans 122(10), 7938-7957 (2017), measured the size distribution of droplets generated by a breaking wave impinging on an oil slick. This method must assume that particles have a spherical shape which largely limits its application in measurement tasks, especially for solid particles with irregular shapes.

Recent development by Shao et al, "A hybrid image processing method for measuring 3D bubble distribution using digital inline holography," Chem. Eng. Sci. 207, 929-941 (2019), has combined a minimum intensity focus metric and wavelet-based focus metric to achieve a 3D distribution of particles with a wide range of sizes. Specifically, the pixels that showed a prominent intensity peak in their longitudinal intensity profile were separated into the small particle group. Other pixels in the holograms were treated as large particles/clusters or background pixels. The large particles were segmented from 2D minimum intensity projection and their depths were determined using a wavelet-based focus metric. This method automatically divides the particles into two groups, largely (but not exclusively) based on their sizes. The Haar wavelet adopted in the wavelet-based focus metric allows accurate focus estimation of single pixels which can be used for estimation of particle 3D orientation. This method has been used for the measurement of bubble size, shape, and orientation in the wake of a ventilated supercavity to estimate instantaneous gas leakage from the cavity. However, this hybrid approach is time consuming (>5 min per hologram) and requires tuning multiple parameters involved in the segmentation of large particles and the wavelet-based focus metric. In general, previously developed particle segmentation methods in hologram processing are usually time consuming and sensitive to hologram noise which limits their applications to low concentration particle fields and low background noise. Additionally, these methods usually require fine tuning of parameters to achieve an optimal performance for holograms acquired under different conditions.

Conventional reconstruction methods such as the angular spectrum method convolve the holograms with diffraction kernels such as the Rayleigh-Sommerfeld and Kirchhoff-Fresnel formulas, and extract particle positions using image segmentation or focus metrics. Image segmentation relies on prescribed intensity thresholds to distinguish the particles from the background, and its performance can deteriorate rapidly with increasing noise in the hologram. Noise in the hologram can be caused by cross-interference of scattered waves from adjacent particles as the particle concentration increases. Focus metric methods employ various criteria (e.g., edge sharpness, intensity distribution, etc.) to characterize the focus level of particles. These criteria are usually sensitive to detailed features of particles and the noise level in the holograms, limiting their application to low concentration particle fields with low background and cross-interference noises. Many approaches to overcome these issues with focus metric methods are directed to hardware designs to improve hologram quality or encode more information during the recording step of holography. However, the implementation of these approaches requires sophisticated mechanical and optical components. Numerical approaches may replace the mechanical complexity with computational complexity.

Several inverse reconstruction methods such as deconvolution and iterative optimization have been proposed to improve particle reconstruction accuracy. The deconvolution approach models the blurring observed in the 3D reconstruction as the product of convolution of the true object field with a point spread function (PSF). The PSF must be modeled based on known diffraction formulas or experimentally obtained through a hologram of a point-like object. Iterative optimization methods employ hologram formation models to minimize the difference between the observed and modeled holograms with a set of physical constraints like sparsity and smoothness. However, these advanced methods may be computationally intensive and may require fine tuning parameters to get optimal results. More importantly, the PSFs and hologram formation models do not incorporate dynamic noise characteristics associated with optical distortion and particle cross-interference, which may substantially hamper the performance of these methods.

Recently, machine learning using deep neural networks (DNNs) has emerged as a prevailing tool for various image analysis tasks. For instance, machine learning with DNNs has become a powerful tool in object segmentation from noisy images for biomedical and machine vision applications. For particle analysis, using 2D bright field imaging of bubbly flow, Ilonen et al, "Comparison of bubble detectors and size distribution estimators," Pattern Recognit. Lett. 101, 60-66 (2018), have demonstrated that the adoption of a convolutional neural network (CNN) could yield a higher accuracy in segmenting individual bubbles compared to conventional algorithms like intensity thresholding and watershed segmentation.

Adoption of DNNs has drastically enhanced processing speed and yielded more accurate results than conventional inverse approaches for some applications. However, compared to other fields of computational imaging, machine learning has been under-utilized in DH. Machine learning in DH has been adopted for transforming hologram reconstructions to microscopic images similar to those commonly used in biological and medical examination, and classification of the particle species captured in the hologram. In hologram processing, the majority of investigations on the application of machine learning have focused on image modality transformations (i.e., transforming hologram reconstruction to commonly used microscopic imaging) (Liu et al. 2019a, and Liu et al. 2019b) and 2D intensity and phase reconstruction of holograms (Rivenson et al. 2018, Wang et al. 2018, and Wang et al. 2019). For single object holograms, the 3D information can be extracted using learning-based regression approaches (Hannel el al. 2019, Ren et al. 2018 and Jaferzadeh et al. 2019). Recent work has employed CNNs in 3D reconstruction of tracer fields (Shimobaba et al. 2019, Shao et al. 2019b).

Only a handful of studies have implemented machine learning for particle imaging using holography, most of which deal with single-particle holograms and using learning-based regression to extract particle depth information. For example, Ren et al. "Learning-based nonparametric autofocusing for digital holography," Optica 5, 337-344 (2018) describes a convolutional neural network (CNN) that yields more accurate particle depth than conventional reconstruction methods and other machine learning approaches. Shimobaba et al, "Digital holographic particle volume reconstruction using a deep neural network," Appl. Opt. 58, 1900-1906 (2019) describes applying machine learning for multi-object particle field reconstruction from holograms through a machine learning segmentation approach. Shimobaba employed a U-net CNN architecture with an L1-regularized loss function and trained on synthetic holograms with particle concentration varying from $4.7 \times 10^{-5}$ particles per pixel (ppp) to $1.9 \times 10^{-4}$ ppp. The algorithm of Shimobaba demonstrated good reconstruction results for low concentration synthetic holograms in the presence of Gaussian noise, with rapid decays in performance with increasing particle concentrations. Such concentration increases are typically required for many practical measurement applications. Furthermore, the regularization method employed in the approach of Shimobaba tends to be unstable, affecting the convergence of the solution.

Thus, there are at least three unique technical challenges associated with 3D particle imaging using digital holography. First, while the signal of an individual object can spread over a large region of the hologram, the reconstructed particle field usually consists of a group of sparse objects. When a learning-based approach is used to replace the reconstruction, this sparsity causes the training process to be highly unstable and produce incorrect results. Second, 3D particle field reconstruction may require very accurate measurements for each particle which differs from many conventional learning-based imaging tasks such as classification or global regression of the image. Finally, the desired metrics, recording parameters, and hologram appearance are coupled, limiting the generalizability of a model trained on a specific set of data. These challenges may also appear in light field imaging, imaging through diffusive media, defocus imaging, and other methods.

This disclosure describes techniques that may address the above-mentioned issues. For example, this disclosure describes a specially designed machine learning approach for 3D particle field reconstruction in DH, which can also be employed in other computational imaging tasks sharing similar traits. This disclosure also describes a learning-based 3D particle measurement method using holograms. The techniques of this disclosure aim to address the issues related to particle segmentation from reconstructed holograms like complex segmentation criteria and tuning of parameters. Compared to prior machine learning approaches and inverse reconstruction, the techniques of this disclosure may have higher particle extraction rates and positioning accuracy for both synthetic and experimental holograms, especially with high particle concentrations up to 0.06 particles per pixel.

In accordance with the techniques of this disclosure, computing system 104 may perform machine learning holography for 3D particle field reconstruction using a specially designed CNN with components aiming to cope with challenges arising in particle holograms where accurate measurement of individual particles is a significant consideration. The techniques of this disclosure may be able to process very high-density particle field holograms with significant speed improvement. In other words, the techniques of this disclosure may be able to achieve better performance in comparison to the state-of-the-art non-machine-learning methods in terms of particle extraction rate and positioning accuracy with significantly improved processing speed. Furthermore, the techniques of this disclosure may be adapted to other types of particle field imaging particularly for 3D measurements. In other words, the learning-based approach of this disclosure can be extended to other types of image-based particle size and location measurements.

As described herein, computing system 104 may implement a machine learning model 109. Machine learning model 109 includes a U-net CNN 110 that generates data based on holograms generated by holographic imaging apparatus 102. U-net CNNs were initially developed for medical and biological image segmentation and have also been used in learning-based image-to-image transformations and multi-object classification from single images. U-net CNN 110 may have three input channels and two output channels, and specially designed loss functions.

In accordance with some examples of this disclosure, computing system 104 may obtain or otherwise receive input data. In some examples, the input data comprises at least one of an original hologram of a 3D particle field (e.g., particle field 108), an approximate depth map of the 3D particle field (e.g., an approximate depth map), or a maximum phase projection of the 3D particle field. Holographic imaging apparatus 102 may generate the original hologram. The depth map of the 3D particle field is a 2D image in which pixel intensities correspond to the depths of particles in the 3D particle field. When a 3D representation of the 3D particle field is reconstructed from the original hologram, each pixel (voxel) in the 3D representation corresponds to a complex number having a real component and a phase component (i.e., an imaginary component). The maximum phase projection is a projection of a maximum phase component of the complex numbers onto a 2D plane such that, for each position p having coordinates ($x_p$, $y_p$) in the 2D plane, a value at the position is equal to a maximum phase component of the 3D representation having coordinates $x_p$, $y_p$, and any value of z.

As described herein, computing system 104 may apply U-net CNN 110 to the input data to generate output data. U-net CNN 110 comprises a set of one or more encoder blocks and a set of one or more decoder blocks. For each respective encoder block of the set of encoder blocks, the respective encoder block has a residual connection between a first layer of the respective encoder block and a second layer of the respective encoder block that skips over a convolution layer of the respective encoder block between the first layer of the respective encoder block and the second layer of the respective encoder block. For each respective decoder block of the set of decoder blocks, the respective decoder block has a residual connection between a first layer of the respective decoder block and a second layer of the respective decoder block that skips over a convolution layer of the respective decoder block between the first layer of the respective decoder block and the second layer of the respective decoder block. U-net CNN 110 may provide output of a last-occurring encoder block of the set of encoder blocks as input to a first-occurring decoder block of the set of decoder blocks. The output data includes a first output image and a second output image. The first output image may comprise a channel in which pixel intensity corresponds to relative depth of particles in the 3D particle field. The second output image indicates locations of centroids of the particles in the 3D particle field.

In another example in accordance with one or more techniques of this disclosure, computing system 104 may obtain input data. The input data may comprise at least one of a hologram of a 3D particle field (e.g., particle field 108), an image reconstructed from the hologram to a particular depth, or a minimum intensity projection in a longitudinal (depth) direction from a reconstructed optical field of the hologram. When a 3D representation of the 3D particle field is reconstructed from the hologram, each pixel (voxel) in the 3D representation corresponds to a complex number having a real component (i.e., an intensity component) and a phase component (i.e., an imaginary component). The minimum intensity projection is a projection of a minimum intensity component of the complex numbers onto a 2D plane such that, for each position p having coordinates $(x_p, y_p)$ in the 2D plane, a value at the position is equal to a minimum intensity component of the 3D representation having coordinates $x_p$, $y_p$, and any value of z.

Computing system 104 may apply U-net CNN 110 to the input data to generate output data. U-net CNN 110 comprises a set of one or more encoder blocks and a set of one or more decoder blocks. For each respective encoder block of the set of encoder blocks, the respective encoder block has a residual connection between a first layer of the respective encoder block and a second layer of the respective encoder block that skips over a convolution layer of the respective encoder block between the first layer of the respective encoder block and the second layer of the respective encoder block. For each respective decoder block of the set of decoder blocks, the respective decoder block has a residual connection between a first layer of the respective decoder block and a second layer of the respective decoder block that skips over a convolution layer of the respective decoder block between the first layer of the respective decoder block and the second layer of the respective decoder block. Output of a last-occurring encoder block of the set of encoder blocks is input to a first-occurring decoder block of the set of decoder blocks. The output data includes a first output image and a second output image. In this example, the first output image comprises a particle size map for particles in the 3D particle field. The particle size map for the particles in the 3D particle field may comprise a stack of 2D images. Each of the 2D corresponds to a different depth z in the 3D particle field. Each 2D image of the particle size map includes pixels at locations corresponding to the x-y positions of the particles at the depth corresponding to the 2D image. Intensity values of the pixels in the 2D image corresponding to particles indicate sizes of the particles. The second output image indicates locations of centroids of the particles in the 3D particle field.

As described herein, the residual connection, Swish function, Huber loss function and mean square error loss function with total variation regularization in the design of U-net CNN 110 may significantly improve the training process of the machine learning model used in hologram reconstruction. In other examples, other types of loss functions may be used. Resulting models may avoid ghost particles reconstructed from holograms with simplified post processing procedures. As described elsewhere in this disclosure, computing system 104 may preprocess the holograms prior to inputting the holograms to U-net CNN 110. Preprocessing of the holograms before machine learning reconstruction may enhance particle positioning accuracy. The framework of the machine learning method may be extendable to many particle field imaging techniques, particularly for 3D measurements.

Computing system 104 may use training data 112 to train U-net CNN 110. Training data 112 may include training data examples. Each training data example may include a set of input data and a corresponding set of output data. The input data of a training data example may include the types of input data discussed herein. The output data of a training data example may include the types of output data discussed herein.

Figure 2:
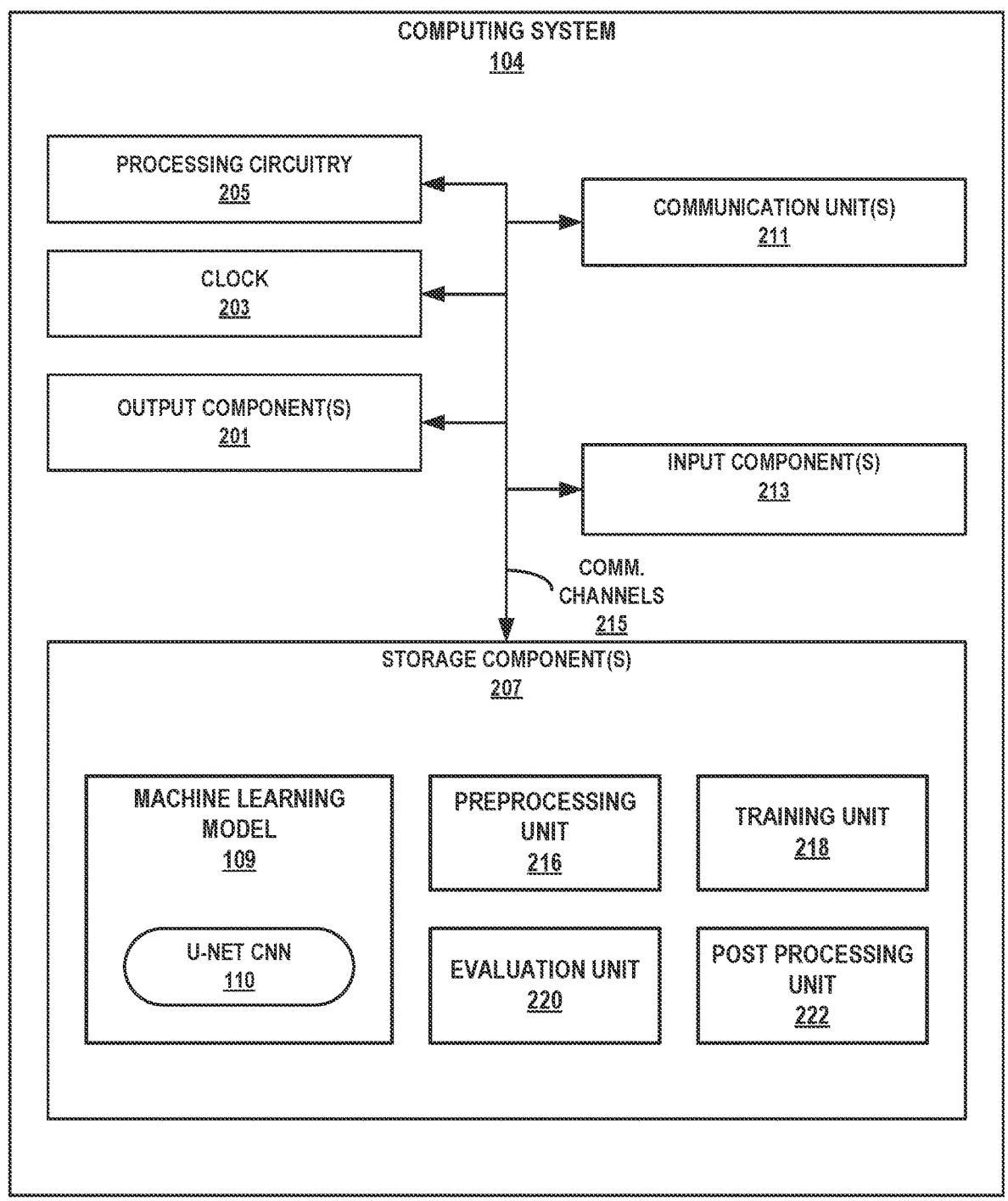
FIG. 2 is a block diagram illustrating an example computing device, in accordance with one or more techniques of the disclosure.

FIG. 2 is a block diagram illustrating an example computing system 104 in accordance with one or more techniques of the disclosure. Computing system 104 of FIG. 2 is described below as an example computing device that may process holograms of a particle field in accordance with techniques of this disclosure. FIG. 2 illustrates only one example of computing system 104, and many other examples of computing system 104 may be used in other instances and may include a subset of the components included in example computing system 104 or may include additional components not shown in example computing system 104 of FIG. 2.

As shown in the example of FIG. 2, computing system 104 includes processing circuitry 205, one or more input components 213, one or more communication units 211, one or more output components 201, and one or more storage components 207. Storage components 207 of computing system 104 include machine learning model 109, which includes U-net CNN 110. Communication channels 215 may interconnect each of the components 201, 203, 205, 207, 211, and 213 for inter-component communications (physically, communicatively, and/or operatively). In some examples, communication channels 215 may include a system bus, a network connection, an inter-process communication data structure, or any other method for communicating data.

One or more communication units 211 of computing system 104 may communicate with external devices, such as another of computing devices 102 of FIG. 1, via one or more wired and/or wireless networks by transmitting and/or receiving network signals on the one or more networks. Examples of communication unit(s) 211 include a network interface card (e.g., an Ethernet card), an optical transceiver, a radio frequency transceiver, a GPS receiver, or any other type of device that can send and/or receive information. Other examples of communication unit(s) 211 may include short wave radios, cellular data radios, wireless network radios, as well as universal serial bus (USB) controllers.

One or more input components 213 of computing system 104 may receive input. Examples of input are tactile, audio, and video input. Input component(s) 213 of computing system 104, in one example, includes a presence-sensitive input device (e.g., a touch sensitive screen), mouse, keyboard, voice responsive system, video camera, microphone or any other type of device for detecting input from a human or machine. In some examples, input component(s) 213 may include one or more sensor components, one or more location sensors (GPS components, Wi-Fi components, cellular components), one or more temperature sensors, one or more movement sensors (e.g., accelerometers, gyroscopes), one or more pressure sensors (e.g., barometer), one or more ambient light sensors, and one or more other sensors (e.g., microphone, camera, infrared proximity sensor, hygrometer, and the like).

One or more output components 201 of computing system 104 may generate output. Examples of output are tactile, audio, and video output. Output component(s) 201 of computing system 104, in one example, includes a sound card, video graphics adapter card, speaker, liquid crystal display (LCD), or any other type of device for generating output to a human or machine.

Clock 203 is a device that allows computing system 104 to measure the passage of time (e.g., track system time). Clock 203 typically operates at a set frequency and measures a number of ticks that have transpired since some arbitrary starting date. Clock 203 may be implemented in hardware or software.

Processing circuitry 205 may implement functionality and/or execute instructions associated with computing system 104. Examples of processing circuitry 205 include application processors, display controllers, auxiliary processors, one or more sensor hubs, and any other hardware configured to function as a processor, a processing unit, or a processing device. Processing circuitry 205 of computing system 104 may retrieve and execute instructions stored by storage components 207 that cause processing circuitry 205 to perform operations for processing holograms of particle fields. The instructions, when executed by processing circuitry 205, may cause computing system 104 to store information within storage components 207.

One or more storage components 207 within computing system 104 may store information for processing during operation of computing system 104. In some examples, storage component(s) 207 includes a temporary memory, meaning that a primary purpose of at least one of storage component(s) 207 is not long-term storage. Storage component(s) 207 of computing system 104 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage component(s) 207, in some examples, also include one or more computer-readable storage media. Storage component(s) 207 in some examples include one or more non-transitory computer-readable storage mediums. Storage component(s) 207 may be configured to store larger amounts of information than typically stored by volatile memory. Storage component(s) 207 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage component(s) 207 may store program instructions and/or information (e.g., data) associated with machine learning model 109, such as U-net CNN 110.

Storage component(s) 207 may include computer-executable instructions associated with a preprocessing unit 216, a training unit 218, an evaluation unit 220, and a post processing unit 222. In some examples, computing system 104 may perform actions attributed in this disclosure to preprocessing unit 216, training unit 218, evaluation unit 220, and postprocessing unit 222 when processing circuitry 205 of computing system 104 executes instructions of preprocessing unit 216, training unit 218, evaluation unit 220, and postprocessing unit 222. In other examples, computing system 104 may include special-purpose circuitry for performing activities of one or more of preprocessing unit 216, training unit 218, evaluation unit 220, or post processing unit 222. In general, preprocessing unit 216 preprocesses holograms generated by holographic imaging apparatus 102 (FIG. 1). Training unit 218 is configured to train machine learning model 109 (e.g., U-net CNN 110). Evaluation unit 220 is configured to use machine learning model 109 to generate output data based on input data. Post processing unit 222 performs post processing on images generated by machine learning model 109.

Figure 3:
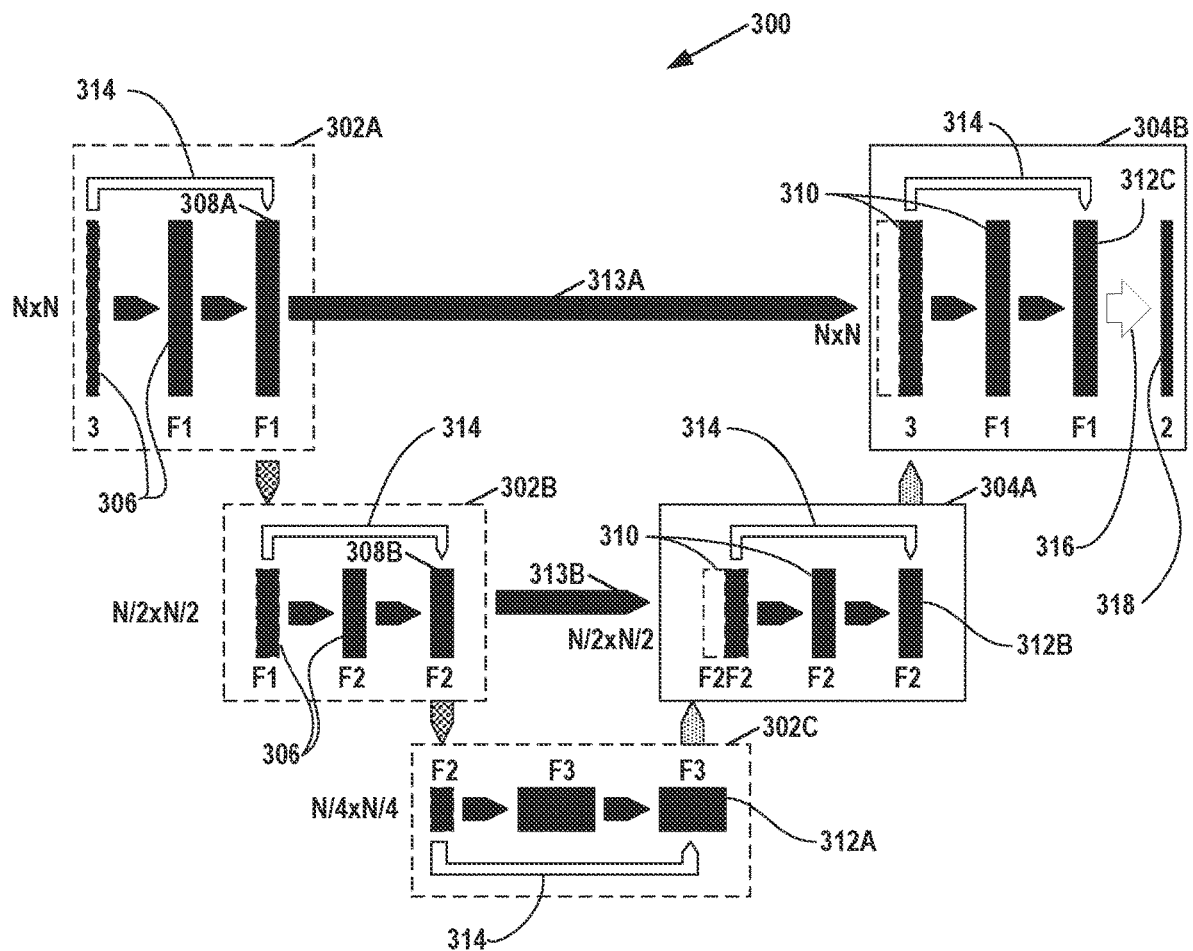
FIG. 3 is a conceptual diagram illustrating an example U-net convolutional neural network (CNN) for holographic reconstruction of a 3D particle field, in accordance with one or more techniques of this disclosure.

FIG. 3 is a conceptual diagram illustrating an example U-net CNN 300 for holographic reconstruction of a 3D particle field or particle segmentation, in accordance with one or more techniques of this disclosure. U-net CNN 300 is an example implementation of U-net CNN 110. Thus, discussion in this disclosure of U-net CNN 110 may apply to U-net CNN 300.

In this example, U-net CNN 300 includes a series of encoder blocks 302A, 302B, 302C (collectively, "encoder blocks 302") and decoder blocks 304A, 304B (collectively, "decoder blocks 304"). In the example of FIG. 3, encoder blocks 302 are indicated with dashed-lined blocks and decoder blocks 304 are indicated with solid-line blocks. In the example of FIG. 3, F1, F2, and F3 indicate different block sizes. In encoder blocks 302, two consecutive sets of convolution layers 306 and activation functions are used to encode local features of input images into channels. Two encoder blocks (encoder blocks 302A, 302B) are connected by a maximum pooling layer (maximum pooling layers 308A, 308B) that down-samples the feature maps in order to extract global features. Decoder blocks 304 are similar but in reverse. Decoder blocks 304 use two consecutive convolution layers (convolution layers 310) to decode the channels to form an image and two decoder blocks (decoder blocks 304A, 304B) are connected by up-convolution layers (up-convolution layers 312A, 312B, 312C) to resize feature maps. In general, an up-convolution layer is a layer that outputs more data samples than the up-convolution layer receives as input. The output feature map of the final encoder block (encoder block 302C) is connected to the first decoder block (decoder block 30A) through up-convolution layer 312A. In the example of FIG. 3, layers that are directly connected (e.g., connected without convolution, normalization, or Swish activation) to previous layers are shown using dashed-line blocks.

U-net CNN 300 also includes skip connections 313A, 313B (black arrows in FIG. 3) whereby the output of an encoder block is concatenated to the same-size decoder block which combines the local and global features of images for training in the deeper stage of U-net CNN 300. In comparison to a simple CNN architecture without skip connections, U-net CNN 300 may be more suitable for particle field reconstruction from a hologram because the skip connections make use of the spread of individual particle information over a large portion of the image (at both local and global scales).

U-net CNN 300 as shown in FIG. 3 is one example. In other examples, U-net CNN 300 may include different numbers of encoders, decoders, layers, etc. than shown in FIG. 3. For instance, in some examples, U-net CNN 300 has 4 encoder blocks and 3 decoder blocks, and the number of output encoder channels are 64 and 512 for the first and last encoder block, respectively. A feature of U-net CNN 300 is that U-net CNN 300 can be directly applied to images of arbitrary size (regardless of the training set image size) since there are no densely connected layers.

Compared with a conventional U-net architecture, U-net CNN 300 has residual connections 314 within each encoder block and decoder block (white arrows in FIG. 3) and uses a Swish (Sigmoid-weighed Linear Unit) activation function (Equation 1, below) for all layers except the last layer.

$$f(x) = \frac{x}{1+e^{-x}} \quad (1)$$

The x in Eqn. 1 corresponds to the outputs from the previous layer, f(x) is the input to the next layer, e is Euler's number. Residual connections 314 may increase the training speed and may reduce the likelihood of the training becoming trapped at a local minimum. Within an encoder block, a skip connection (e.g., one of skip connections 313) may be achieved through the connection of channels from maximum pooling layers 308 to the output channels. In a decoder block, the residual connection uses the channels from the previous decoder block connected by an up-convolution layer. Such a configuration may allow the necessary shortcut connection (i.e., skipping one or two convolution layers) for a residual net. Additionally, the commonly used Rectified Linear Unit (ReLU) activation function is replaced in U-net CNN 300 with the Swish activation function (Eqn. 1).

Figure 4:
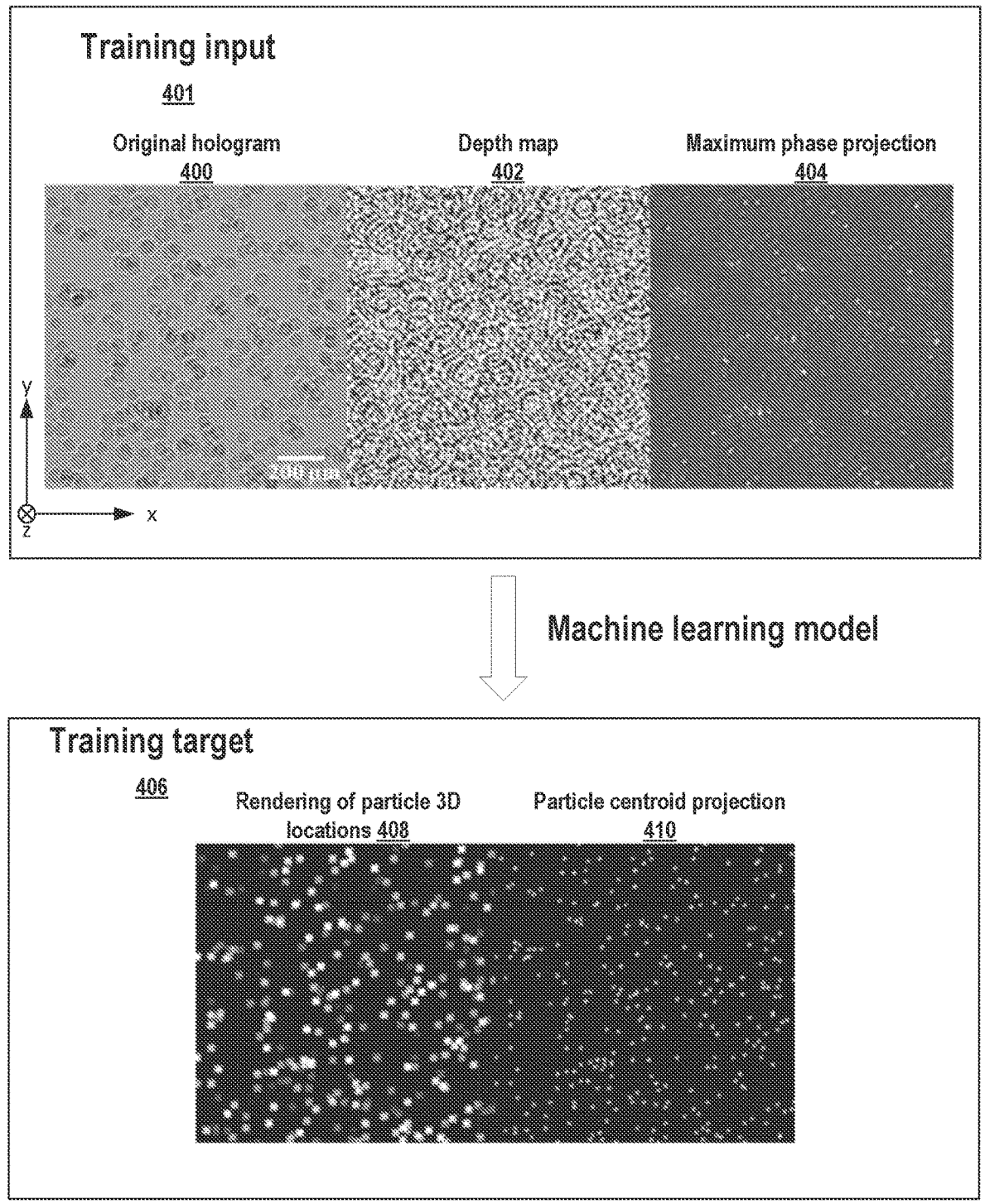
FIG. 4 illustrates an example of a sample training input and training target, in accordance with one or more techniques of this disclosure.

FIG. 4 illustrates an example training input and training target in accordance with one or more techniques of this disclosure. In the example of FIG. 4, the training input consists of 300 particles, the particles have a concentration of 0.018 particles per pixel (ppp) and the hologram size is 128×128 pixels. FIG. 4 includes a hologram 400 that is formed with a pixel resolution of 10 micrometers (µm) with a laser illumination wavelength of 632 nanometers (nm). For particle holograms, target images are usually sparse due to the small size of particle centroids, which leads to the majority of values in the feature layers being equal to 0. Therefore, during training, the parameters within machine learning model 109 (e.g., U-net CNN 110) have a higher tendency to be 0, and subsequently untrainable since the derivative of ReLU is 0 once the weights are equal or less than 0. This problem may cause substantial degradation for deep CNN models using the ReLU activation function. Comparatively, the Swish activation function is smooth and non-monotonic near 0 which may increase the number of effective parameters in the training, especially for sparse targets. However, the Swish activation function may affect the accuracy of prediction from the machine learning model 109 due to the inclusion of negative output values. To solve this technical problem, U-net CNN 300 uses, in this example, a Sigmoid activation 316 in the final decoder block (i.e., decoder block 304B of FIG. 3) to produce results within a range from 0 to 1. The output of decoder block 304B may include a rendering of 3D particle locations and a particle centroid projection.

Training unit 218 may use sets of training input to train U-net CNN 300. As shown in the example of FIG. 4, a set of training input 401 may include or consist of three channels: an original hologram 400, the corresponding images of pixel depth projection (i.e., depth map 402), and a maximum phase projection 404. Holographic imaging apparatus 102 may generate original hologram 400. Holographic imaging apparatus 102 may generate a collimated beam and measures the interference of particles in the 3D particle field to generate hologram 400. In the example of FIG. 4, the pixel resolution of original hologram 400 is 10 µm with a laser illumination wavelength of 632 nm and an image size of 128×128 pixels. Particles within holograms may be randomly distributed with a distance between 1 mm and 2.28 mm to the sensor. The resolution in the z direction is also 10 µm with 128 discrete depth levels. Depth map 402 and maximum phase projection 404 are additional information obtained from preprocessing the holograms.

Preprocessing unit 216 of computing system 104 may employ preprocessing to incorporate existing hologram formation knowledge into machine learning model 109 (e.g., U-net CNN 110) and reduce the need of machine learning model 109 to fully learn the required physics during training. In general, preprocessing refers to a preliminary reconstruction of holograms to generate side channels (e.g., depth map 402, maximum phase projection 404) for the inputs of the training to relieve the burden of the model fully learning the hologram formation physics. Additionally, training with known hologram formation physics instead of solely relying on model training may avoid spurious and unphysical outputs from the trained machine learning model 109. A noticeable improvement of particle extraction rate especially for high concentration cases with these preprocessing steps in comparison to training directly on the raw holograms. Using an angular spectrum method (e.g., as described in T. Latychevskaia and H. W. Fink, "Practical algorithms for simulation and reconstruction of digital in-line holograms," Appl. Opt. 54, 2424-2434 (2015)), computing system 104 may generate a 3D complex optical field, $u_p(x, y, z)$, from original hologram 400, which is denoted as I(x,y), as shown in Equation 2, below:

$$u_p(x, y, z) = F^{-1}\left[F(I(x, y)) \times F\left(\frac{\exp(jkz)}{j\lambda z}\exp\left\{j\frac{k}{2z}[(x^2+y^2)]\right\}\right)\right] \quad (2)$$

$$z_{approx} = \{u_p(x,y,z) \times \text{conj}[u_p(x,y,z)]\} \quad (3)$$

$$P(x,y) = \max_z\{\text{angle}[u_p(x,y,z)]\} \quad (4)$$

In Equation 2, λ is the wavelength, k is the wave number and F is the Fourier transform operator. The wave number k may be equal to 2π/λ. Preprocessing unit 216 may generate depth map 402 by projecting the z locations where the pixels have the maximum intensity from $u_p(x, y, z)$ to the xy plane (e.g., as shown in Equation 3). Preprocessing unit 216 may calculate maximum phase projection 404 from Equation 4.

During the training process, training unit 218 may use evaluation unit 220 to apply U-net CNN 300 to generate output data based on a set of training input (e.g., training input 401). Training unit 218 may use loss functions to compare the output data to a training target for the set of training output 402. Training unit 218 may then perform a backpropagation operation that modifies parameters of U-net CNN 300 based on loss values generated by the loss functions.

In the example of FIG. 4, a training target 406 may include or consist of two output channels. The first channel 408 is a grayscale channel in which pixel intensity corresponds to the relative depth of each particle. The second channel 410 is a binary image of particle xy centroids. While the particles are encoded as only a single pixel in the xy binary channel (i.e., channel 410), doing the same for the depth-encoded grayscale channel (i.e., channel 408) may produce a trained machine learning model that generates an output data with inaccurate pixel intensities and substantial background noise. To prevent this, the labeled particles in the depth-encoded grayscale target (i.e., channel 408) are set to a size of 3×3 pixels.

Because of the differences between the two target channels (i.e., channel 408 and channel 410), training unit 218 may use a different type of loss function for each of the channels. Specifically, training unit 218 may evaluate a Huber loss function on the output channel encoding particle depth (i.e., channel 408). As shown in Equation 5, below, the Huber loss function uses a modified mean absolute error (MAE) of the prediction (Y) relative to the ground truth (X) as the training loss when the MAE is larger than the preset $\delta$ (0.002 for the synthetic dataset), and uses a mean squared error (MSE) when the MAE is less than S. The Huber loss function may improve the training robustness and prediction accuracy by using MAE once the averaged pixel intensities are biased by the outliers. The parameter $\delta$ in Equation 5, below, can be determined based on the measurement accuracy requirements, with a smaller $\delta$ resulting in an improved particle depth resolution. However, too small $\delta$ may lead to an unstable training process and have multiple solutions similar to using pure MAE loss.

$$L = \left\{ \frac{1}{2} \|Y - X\|_2^2 \text{ if } \|Y - X\|_1 \leq \delta \, \delta \|Y - X\|_1 - \frac{1}{2} \delta^2 \text{otherwise} \right. \quad (5)$$

Training unit 218 may use an MSE loss regularized by the total variation (TV) of the prediction for the xy centroid channel (i.e., channel 410), as shown in Equation 6, below. As shown in Equation 7, below, TV is the sum of first-order gradients over the image of size $N_x \times N_y$.

$$L = (1-\alpha)(\|Y-X\|_2^2) + \alpha \|Y\|_{TV}^2 \quad (6)$$

$$\|Y\|_{TV} = \sum_{i=1}^{N_x} \sum_{j=1}^{N_y} \sqrt{(Y_{i,j} - Y_{i-i,j})^2 + (Y_{i,j} - Y_{i,j-1})^2} \quad (7)$$

TV regularization has previously been adopted in iterative optimization methods for hologram reconstruction. TV is robust to outliers in the images and may cause machine learning model 109 (e.g., U-net CNN 300) to produce a smooth background in the output xy centroid channel (i.e., channel 410). Such regularization may reduce the likelihood of background pixels having non-zero values, which may result in the detection of ghost particles. The variable $\alpha$ in Equation 6 is a parameter that determines the smoothness of the results. A small value of $\alpha$ (~0.0001) may be used for training because TV regularization acts as a low-pass filter and too much smoothing can degrade the accuracy of the results.

In some examples, an Adam optimizer (see D. P. Kingma and J. Ba, "Adam: a method for stochastic optimization," axXiv: 1412.6980 (2014)) is used with the default learning rate of 0.001. In some examples, training unit 218 may train U-net 300 using holograms with a first concentration for a first number of epochs. For other holograms with other concentrations, training unit 208 may train U-net 300 for a second, smaller number of 120 epochs, with the training initialized by the base model trained using holograms having the first concentration. This transfer learning approach may decrease the training requirement (e.g., dataset size and training time) for new hologram datasets. To extract the particles from the model output, the predicted particle xy centroid map is first binarized with a threshold of 0.5 (equivalent to the maximum likelihood) to extract the xy centroids of the particles. Subsequently, from the depth-encoded grayscale output (i.e., channel 408), computing system 104 may use the intensity values of the corresponding pixels in the depth map as the particle depth. In other words, computing system 104 may use the intensity value of a pixel in the depth map to determine an actual depth of a corresponding particle in the particle field. A process to determine the actual depth of a particle based on an intensity value of a pixel may be based on parameters used by holographic imaging apparatus 102 when generating the original hologram.

Figure 5:
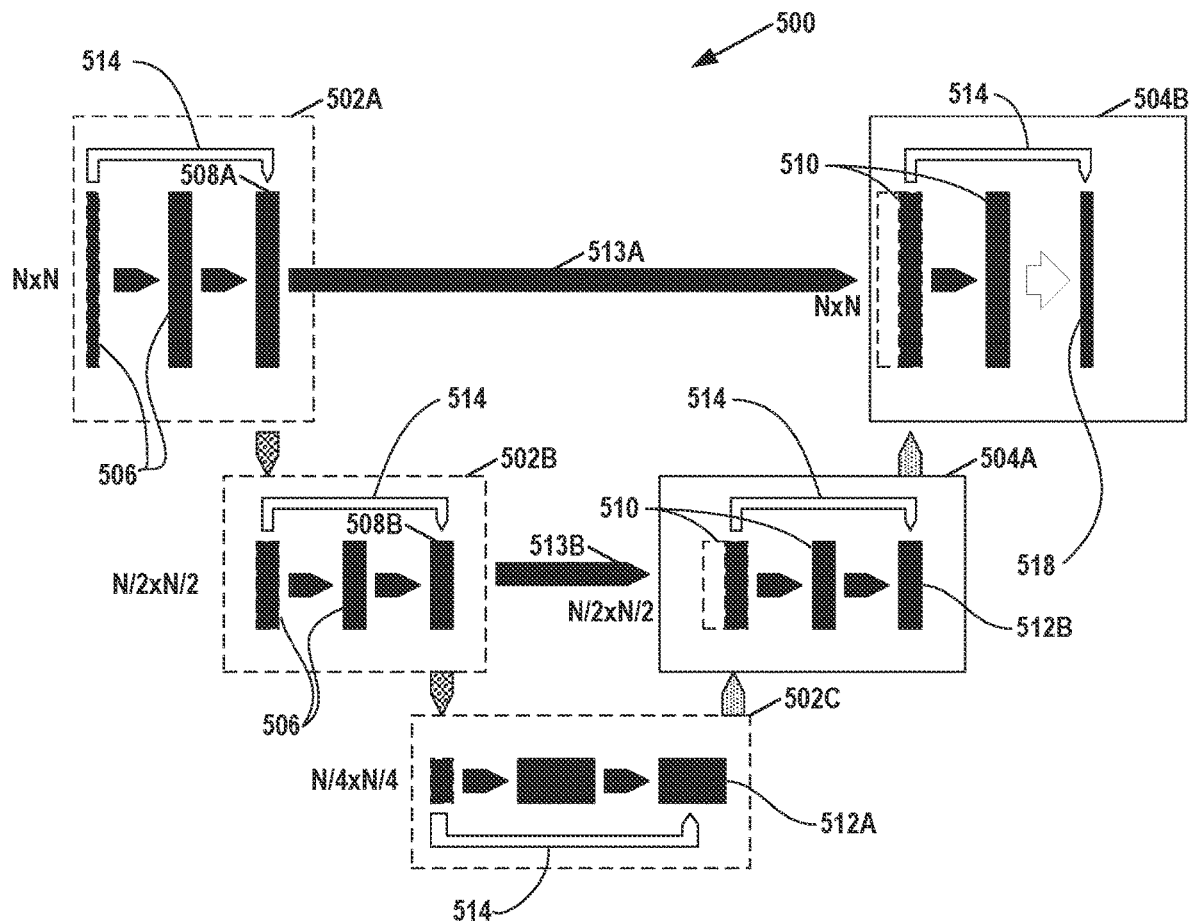
FIG. 5 is a conceptual diagram illustrating an example U-net CNN for particle segmentation, in accordance with one or more techniques of this disclosure.

FIG. 5 is a conceptual diagram illustrating an example U-net CNN 500 for particle segmentation, in accordance with one or more techniques of this disclosure. U-net CNN 500 may adopt residual connections to improve training speed and accuracy of the model prediction. In the example U-net CNN 500, the Swish (Sigmoid-weighed Linear Unit) activation function may replace the commonly used ReLU (rectified linear unit), which may improve performance when training with sparse targets, like particle fields. U-net CNN 500 is an example implementation of U-net CNN 110. Thus, discussion in this disclosure of U-net CNN 110 may apply to U-net CNN 500. In the example of FIG. 5, U-net CNN 500 includes encoder blocks 502A, 502B, and 502C (collectively, "encoder blocks 502"). U-net CNN 500 also includes decoder blocks 504A, 504B (collectively, "decoder blocks 504"). Encoder blocks 502 may include convolution layers 506 and maximum pooling layers 508. Decoder blocks 504 use two consecutive convolution layers (convolution layers 510) to decode the channels to form an image and two decoder blocks (decoder blocks 504A, 504B) are connected by up-convolution layers (up-convolution layers 512A, 512B) to resize feature maps. U-net CNN 500 also includes skip connections 513A, 513B, whereby the output of an encoder block is concatenated to the same-size decoder block which combines the local and global features of images for training in the deeper stage of U-net CNN 500. U-net CNN 500 has residual connections 514 within each encoder block and decoder block and uses a Swish activation function (Equation 1, above) for all except the last layer. The final layer of decoder block 504B may output a particle size map and a 2D centroids map.

Figure 6:
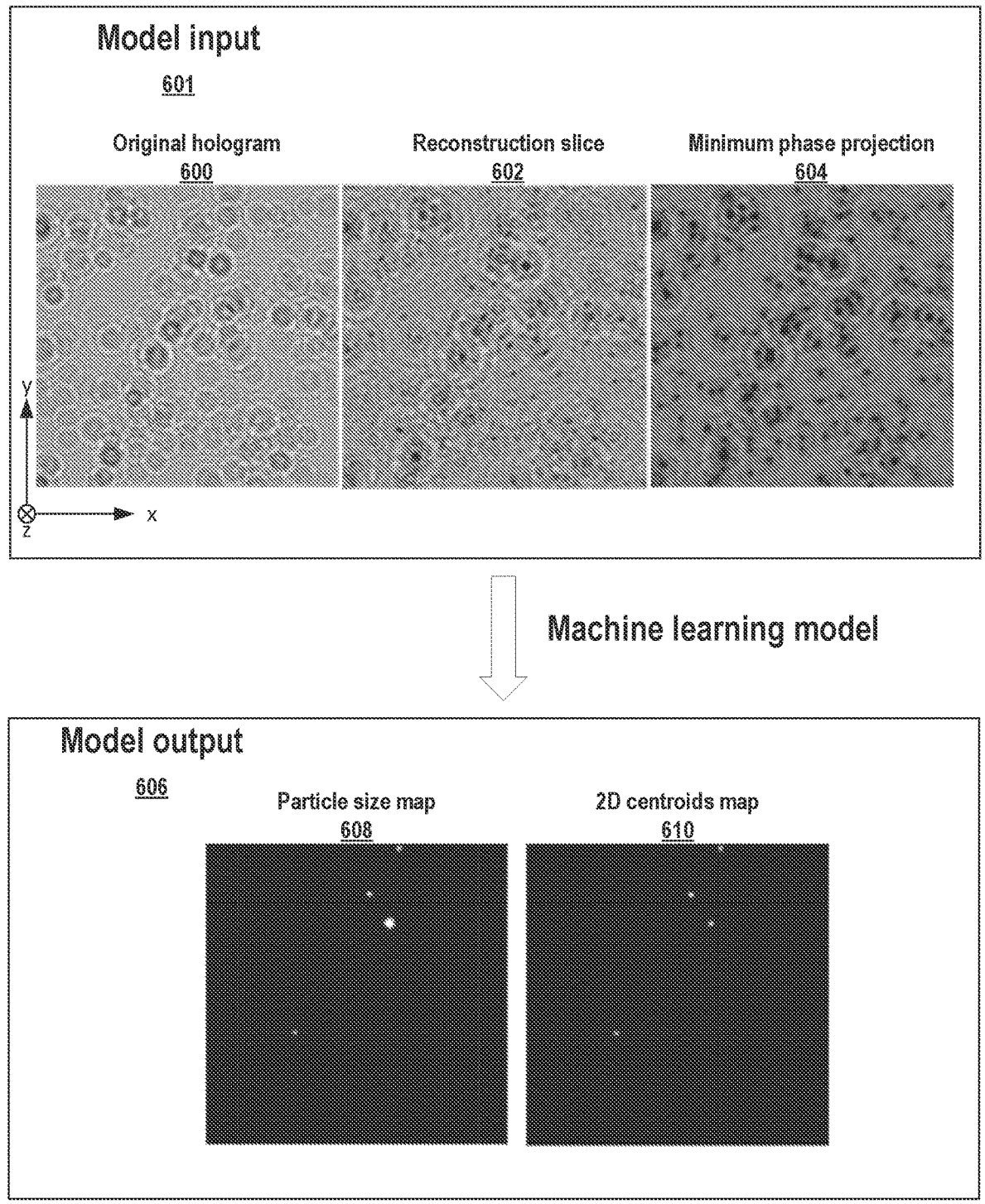
FIG. 6 is a conceptual diagram illustrating example inputs and outputs of the U-net CNN of FIG. 5, in accordance with one or more techniques of this disclosure.

FIG. 6 is a conceptual diagram illustrating example inputs and outputs of U-net CNN 500, in accordance with one or more techniques of this disclosure. In the example of FIG. 6, a set of model input 601 for U-net CNN 500 has three channels: an image reconstructed from hologram at a particular longitudinal location (e.g., reconstruction slice 602), an original hologram (e.g., original hologram 600), and a minimum intensity projection from the reconstructed optical field of the hologram (e.g., minimum phase projection 604). To produce these channels, preprocessing unit 216 may first convolve the original hologram 600 with a Rayleigh-Sommerfeld kernel to get a 3D complex optical field, $u_p(x, y, z)$, e.g., as shown in Equation 7, below.

$$u_p(x, y, z) = F^{-1}\left\{F(I_k(x, y)) \times F\left\{\frac{1}{j\lambda\sqrt{x^2 + y^2 + z^2}}\exp\left[jk\left(\sqrt{x^2 + y^2 + z^2}\right)\right]\right\}\right\} \quad (7)$$

In Equation 7, $I_k$ refers to an enhanced hologram (e.g., original hologram 600) captured in (x, y) planar space and z corresponding to each longitudinal location. The $\lambda$ term in Equation 7 is a wavelength of the illumination beam, k is the wave number, and F is the fast Fourier transform operator. The wave number k may be equal to $2\pi/\lambda$. j indicates the imaginary unit. Preprocessing unit 216 may calculate the pixel intensity (in reconstruction slice 602 of FIG. 6) at each location as the magnitude of complex intensity values from $u_p(x, y, z)$. Preprocessing unit 216 may generate a minimum intensity projection image (e.g., minimum phase projection 604) by projecting the longitudinal minimum intensity of each pixel onto a plane (e.g., the minimum intensity of a pixel in z direction after reconstruction). Hologram preprocessing in this way may reduce the need of machine learning model 109 (e.g., U-net CNN 500) to fully learn the required physics of hologram formation during training.

Evaluation unit 220 may apply U-net CNN 500 to model input 601 to generate model output 606. During the training process, training unit 218 may use evaluation unit 220 to generate model output based on sets of model input. Training unit 218 may use one or more loss functions to compare model output to a corresponding training target. Training unit 218 may then perform a backpropagation operation to modify parameters of U-net CNN 500.

For the training target, training unit 218 may employ a binary image consisting of only in-focus (at the reconstruction depth) particles with their true shapes as a particle size map (e.g., particle size map 608 of FIG. 6). Additionally, training unit 218 may use a 2D particle centroids map (e.g., 2D centroids map 610 of FIG. 6), which is comprised of particle centroid regions (each 2×2 pixels), for determination of particle locations. Training unit 218 may also use the 2D particle centroids map to help remove false detections (i.e., ghost particles) from the prediction (i.e., the particle size map and the 2D particle centroids map).

Training unit 218 may use a modified generalized dice loss (GDL) function to determine the training loss for the particle size map channel. The modified GDL function is capable of multiclass classification. The modified GDL function is shown in Equation 8, below. In Equation 8, N is equal to 1 because only in-focus particle pixels are classified using machine learning model 109 (e.g., U-net CNN 500). As shown in Equation (8), the modified GDL function first calculates a ratio of overlapped areas of class n pixels in the ground truth ($X_n$) and model prediction ($Y_n$) and a modified area of union of $X_n$ and $Y_n$. The training loss is this ratio subtracted from 1. $\delta$ is a relaxation factor to prevent division by zero during training. In some examples, $\delta$ may be set as 0.02. The GDL function may have good performance on rare species in classification problems (e.g., in-focus particles on each reconstruction plane). The measure of the area of union in the denominator may be further modified as the sum of L2 norms of $Y_n$ and $X_n$ instead of their L1 norms. This modification may improve the training stability. In Equation 8, L indicates the loss value.

$$L = 1 - 2\left(\sum_{n=1}^{N} Y_n X_n + \delta\right) / \left(\sum_{N=1}^{N} Y_n^2 + X_n^2 + \delta\right) \quad (8)$$

For the particle 2D centroids channel (e.g., 2D centroids map 610), training unit 218 may use a total variation (TV) regularized mean square error (MSE) loss, e.g., as shown in Equation 9, below. Furthermore, as shown in Equation 10, TV is the sum of first-order gradients over the 2D centroids map (size Nx×Ny). This loss function may force machine learning model 109 (e.g., U-net CNN 500) to generate a prediction with a clean background and to remove false detections (i.e., ghost particles). The parameter $\alpha$ controls the smoothness of model outputs and may be set as 0.0001. Increasing $\alpha$ may degrade the accuracy of the results because TV acts as a filter and may blur the model output with high $\alpha$.

$$L = (1-\alpha)(\|Y-X\|_2^2) + \alpha \times [TV(Y)]^2 \quad (9)$$

$$TV(Y) = \sum_{i=1}^{N_x}\sum_{j=1}^{N_y}\sqrt{(Y_{i,j} - Y_{i-1,j})^2 + (Y_{i,j} - Y_{i,j-1})^2} \quad (10)$$

In Equation 10, $Y_{i,j}$ indicates a pixel intensity value of a pixel at position i,j of a model prediction (e.g., particle size map 608 or 2D centroids map 610).

Post processing unit 222 of computing system 104 may perform post processing on the model predictions. For example, obtaining 3D particle shape and size distribution may require first finding the candidate particles from the particle size channel using an averaged intensity of 0.3 of each connected object. For each candidate particle, within consecutive ±5 reconstruction planes, post processing unit 222 may determine the particle 3D centroids by using the location of the highest intensity object from 2D centroids outputs from the same region determined by the bounding boxes of the candidate particles. On the reconstruction plane found from the previous step, post processing unit 222 conducts a binarization using threshold of 0.3 in the particle bounding boxes to find particle regions. For a region of interest (ROI) without any particle centroids from particle location channel outputs, post processing unit 222 may treat the candidate particles as false detections. For the ROI with multiple centroids on the same reconstruction plane, post processing unit 222 may conduct a marker-controlled watershed segmentation on the binary image from the size channel using the particle centroids from the particle location channel as markers. The calculation of particle size (i.e., area equivalent diameter d=$\sqrt{4A\pi}$, where A is the area occupied by each segmented particles), and particle shape (i.e., eccentricity) may follow the approach provided in Karn et al, "An integrative image measurement technique for dense bubbly flows with a wide size distribution," Chem. Eng. Sci. 122, 240-249 (2015). Compared to previous particle segmentation methods, the post processing techniques of this disclosure may not require any preset parameters other than an intensity threshold. Additionally, in accordance with one or more techniques of this disclosure, post processing unit 222 can segment particles that are occluded or overlapped by applying the segmentation on each reconstruction plane rather than on a 2D projection of the volume. This may allow for higher concentrations compared to prior methods.

Figure 7:
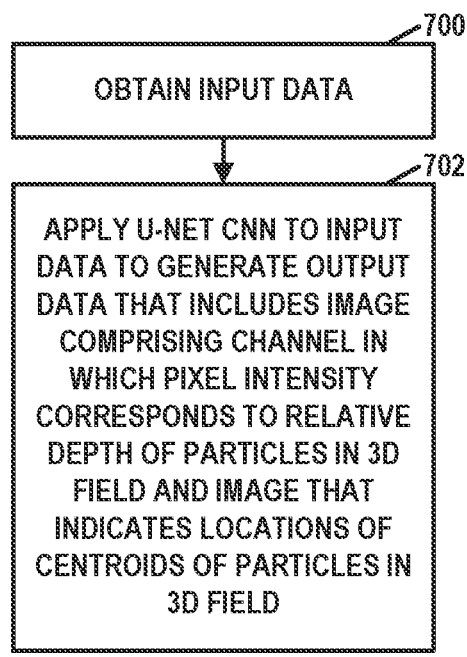
FIG. 7 is a flowchart illustrating an example method for particle/tracer localization or particle field imaging, in accordance with one or more techniques of this disclosure.

FIG. 7 is a flowchart illustrating an example method for particle/tracer localization or particle field imaging, in accordance with one or more techniques of this disclosure. FIG. 7 is explained with reference to FIG. 3 and FIG. 4, but the method of FIG. 7 is not so limited. For instance, the method of FIG. 7 may be used with respect to U-net CNNs that include more or fewer encoder blocks and decoder blocks, more or fewer layers, and so on. In the example of FIG. 7, computing system 104 obtains input data (700). The input data may comprise at least one of an original hologram of a 3D particle field (e.g., original hologram 400 (FIG. 4)), a depth map of the 3D particle field (e.g., depth map 402 (FIG. 4)), or a maximum phase projection of the 3D particle field (e.g., maximum phase projection 404 (FIG. 4)).

In some examples, preprocessing unit 216 of computing system 104 may generate the depth map and the maximum phase projection from the original hologram. For example, computing system 104 may generate a 3D complex optical field (e.g., using Equation 2, above) and may generate the depth map by projecting z locations of pixels in the 3D complex optical field having a maximum intensity value to an xy plane (e.g., using Equation 3, above). Preprocessing unit 216 may generate the maximum phase projection using Equation 4, above.

Furthermore, in the example of FIG. 7, evaluation unit 220 of computing system 104 may apply U-net CNN 300 to the input data to generate output data (702). U-net CNN 300 comprises a set of one or more encoder blocks 302 and a set of one or more decoder blocks 304. For each respective encoder block of the set of encoder blocks 302, the respective encoder block has a residual connection (e.g., residual connections 314) between a first layer of the respective encoder block (e.g., one of convolutional layers 306) and a second layer of the respective encoder block (e.g., one of maximum pooling layers 308 or up-convolution layer 312A) that skips over a convolution layer of the respective encoder block (e.g., one of convolutional layers 306) between the first layer of the respective encoder block and the second layer of the respective encoder block. For each respective decoder block of the set of decoder blocks (e.g., decoder block 304A, 304B), the respective decoder block has a residual connection (e.g., residual connections 314) between a first layer of the respective decoder block (e.g., one of convolution layer 310) and a second layer of the respective decoder block (e.g., one of up-convolution layers 312) that skips over a convolution layer (e.g., convolutional layers 306) of the respective decoder block between the first layer of the respective decoder block and the second layer of the respective decoder block. Output of a last-occurring encoder block (e.g., encoder block 302C) of the set of encoder blocks is input to a first-occurring decoder block of the set of decoder blocks (e.g., decoder block 301C).

In some examples, the output data includes a first output image and a second output image. The first output image comprises a channel (e.g., channel 408) in which pixel intensity corresponds to relative depth of particles in the 3D particle field. The second output image (e.g., channel 410) indicates locations of centroids of the particles in the 3D particle field.

Evaluation unit 220 of computing system 104 may apply various activation functions when applying U-net CNN 300. For instance, in one example, for each respective encoder block of the set of encoder blocks 302, evaluation unit 220 may apply a Swish activation function between layers of the respective encoder block. In this example, evaluation unit 220 may apply the Swish activation function between each layer of each decoder block of the set of decoder blocks (e.g., decoder blocks 304) aside from before a last layer of a last decoder block of the set of decoder blocks. In some examples, evaluation unit 220 applies a Sigmoid activation function before the last layer (e.g., layer 318) of the last decoder block (e.g., decoder block 304B) of the set of decoder blocks.

Furthermore, in some examples, training unit 218 of computing system 104 may train U-net CNN 300. As part of training U-net CNN 300, training unit 218 may calculate a first loss value by applying, to the first output image, a Huber loss function. Additionally, training unit 218 may calculate a second loss value by applying, to the second output image, a Mean Square Error (MSE) loss function regularized by a total variation of the second output image. Furthermore, in this example, training unit 218 may modify parameters of U-net CNN 300 based on the first loss value and the second loss value. For instance, training unit 218 may perform a backpropagation process to modify the parameters (e.g., weights of neurons of U-net CNN 300) based on the first loss value and the second loss value.

Figure 8:
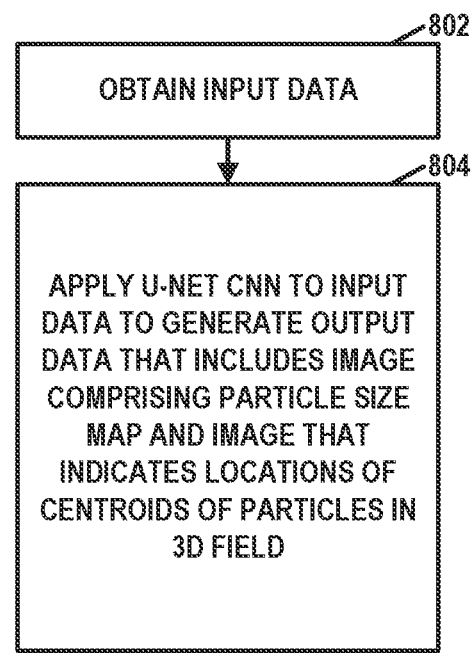
FIG. 8 is a flowchart illustrating an example method for particle segmentation, in accordance with one or more techniques of this disclosure.

FIG. 8 is a flowchart illustrating an example method for particle segmentation, in accordance with one or more techniques of this disclosure. FIG. 8 is explained with reference to FIG. 5 and FIG. 6, but the method of FIG. 8 is not so limited. For instance, the method of FIG. 8 may be used with respect to U-net CNNs that include more or fewer encoder blocks and decoder blocks, more or fewer layers, and so on.

In the example of FIG. 8, computing system 104 may obtain input data (800). The input data may comprise at least one of a hologram of a 3D particle field (e.g., original hologram 600 (FIG. 6)), an image reconstructed from the hologram to a longitudinal location (e.g., reconstruction slice 602), or a minimum intensity projection (e.g., minimum phase projection 604) in a longitudinal direction from a reconstructed optical field of the hologram.

Furthermore, in the example of FIG. 8, evaluation unit 220 of computing system 104 may apply U-net CNN 110 to the input data to generate output data (802). U-net CNN comprises a set of one or more encoder blocks 502 and a set of one or more decoder blocks 504. For each respective encoder block of the set of encoder blocks 502, the respective encoder block has a residual connection 514 between a first layer (e.g., one of convolution layers 506) of the respective encoder block and a second layer (e.g., one of maximum pooling layers 508 or up-convolution layer 512A) of the respective encoder block that skips over a convolution layer of the respective encoder block between the first layer of the respective encoder block and the second layer of the respective encoder block.

For each respective decoder block of the set of decoder blocks 504, the respective decoder block has a residual connection 514 between a first layer (e.g., one of convolution layers 510) of the respective decoder block and a second layer (e.g., one of up-convolution layers 512B or layer 518) of the respective decoder block that skips over a convolution layer of the respective decoder block between the first layer of the respective decoder block and the second layer of the respective decoder block. An output of a last-occurring encoder block (e.g., encoder block 502C) of the set of encoder blocks is input to a first-occurring decoder block (e.g., decoder block 504A) of the set of decoder blocks.

The output data includes a first output image and a second output image. The first output image comprising a particle size map (e.g., particle size map 608) for particles in the 3D particle field. The second output image (e.g., 2D centroids map 610) indicates locations of centroids of the particles in the 3D particle field.

Evaluation unit 220 of computing system 104 may apply various activation functions when applying U-net CNN 500. For instance, in one example, for each respective encoder block of the set of encoder blocks 502, evaluation unit 220 may apply a Swish activation function between layers of the respective encoder block. In this example, evaluation unit 220 may apply the Swish activation function between each layer of each decoder block of the set of decoder blocks (e.g., decoder blocks 304) aside from before a last layer of a last decoder block of the set of decoder blocks. In some examples, evaluation unit 220 applies a Sigmoid activation function before the last layer (e.g., layer 518) of the last decoder block (e.g., decoder block 304B) of the set of decoder blocks 504.

Furthermore, in some examples, training unit 218 of computing system 104 may train U-net CNN 500. As part of training U-net CNN 500, training unit 218 may calculate a first loss value by applying, to the first output image, a generalized dice loss function. Additionally, training unit 218 may calculate a second loss value by applying, to the second output image, a Mean Square Error (MSE) loss function regularized by a total variation of the second output image. Furthermore, in this example, training unit 218 may modify parameters of U-net CNN 300 based on the first loss value and the second loss value. For instance, training unit 218 may perform a backpropagation process to modify the parameters (e.g., weights of neurons of U-net CNN 300) based on the first loss value and the second loss value.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a cassette, magnetic media, optical media, or other computer readable media.

What is claimed is:

1. A method for particle/tracer localization or particle field imaging, the method comprising:
    obtaining input data, the input data comprising at least one of a hologram of a 3-dimensional (3D) particle field, a depth map of the 3D particle field, or a maximum phase projection of the 3D particle field; and
    applying a U-net convolutional neural network (CNN) to the input data to generate output data, wherein:
        the U-net CNN comprises a set of one or more encoder blocks and a set of one or more decoder blocks,
        for each respective encoder block of the set of encoder blocks, the respective encoder block has a residual connection between a first layer of the respective encoder block and a second layer of the respective encoder block that skips over a convolution layer of the respective encoder block between the first layer of the respective encoder block and the second layer of the respective encoder block,
        for each respective decoder block of the set of decoder blocks, the respective decoder block has a residual connection between a first layer of the respective decoder block and a second layer of the respective decoder block that skips over a convolution layer of the respective decoder block between the first layer of the respective decoder block and the second layer of the respective decoder block,
        output of a last-occurring encoder block of the set of encoder blocks is input to a first-occurring decoder block of the set of decoder blocks, and
        the output data includes a first output image and a second output image, the first output image comprising a channel in which pixel intensity corresponds to relative depth of particles in the 3D particle field, and the second output image indicating locations of centroids of the particles in the 3D particle field.

2. The method of claim 1, wherein applying the U-net CNN comprises:
    for each respective encoder block of the set of encoder blocks, applying a Swish activation function between layers of the respective encoder block; and
    applying the Swish activation function between each layer of each decoder block of the set of decoder blocks aside from before a last layer of a last decoder block of the set of decoder blocks.

3. The method of claim 2, wherein applying the U-net CNN comprises:
    applying a Sigmoid activation function before the last layer of the last decoder block of the set of decoder blocks.

4. The method of claim 1, further comprising generating the depth map and maximum phase projection from the hologram.

5. The method of claim 1, further comprising training the U-net CNN, wherein training the U-net CNN comprises:
    calculating a first loss value by applying, to the first output image, a Huber loss function;
    calculating a second loss value by applying, to the second output image, a Mean Square Error (MSE) loss function regularized by a total variation of the second output image; and
    modifying parameters of the U-net CNN based on the first loss value and the second loss value.

6. A method for particle segmentation, the method comprising:
    obtaining input data, the input data comprising at least one of a hologram of a 3-dimensional (3D) particle field, an image reconstructed from the hologram to a longitudinal location, or a minimum intensity projection in a longitudinal direction from a reconstructed optical field of the hologram; and
    applying a U-net convolutional neural network (CNN) to the input data to generate output data, wherein:
        the U-net CNN comprises a set of one or more encoder blocks and a set of one or more decoder blocks,
        for each respective encoder block of the set of encoder blocks, the respective encoder block has a residual connection between a first layer of the respective encoder block and a second layer of the respective encoder block that skips over a convolution layer of the respective encoder block between the first layer of the respective encoder block and the second layer of the respective encoder block,
        for each respective decoder block of the set of decoder blocks, the respective decoder block has a residual connection between a first layer of the respective decoder block and a second layer of the respective decoder block that skips over a convolution layer of the respective decoder block between the first layer of the respective decoder block and the second layer of the respective decoder block,
        output of a last-occurring encoder block of the set of encoder blocks is input to a first-occurring decoder block of the set of decoder blocks, and
        the output data includes a first output image and a second output image, the first output image comprising a particle size map for particles in the 3D particle field, and the second output image indicating locations of centroids of the particles in the 3D particle field.

7. The method of claim 6, wherein applying the U-net CNN comprises:
    for each respective encoder block of the set of encoder blocks, applying a Swish activation function between layers of the respective encoder block; and
    applying the Swish activation function between each layer of each decoder block of the set of decoder blocks aside from before a last layer of a last decoder block of the set of decoder blocks.

8. The method of claim 7, wherein applying the U-net CNN comprises:
    applying a Sigmoid activation function before the last layer of the last decoder block of the set of decoder blocks.

9. The method of claim 6, further comprising training the U-net CNN, wherein training the U-net CNN comprises:
    calculating a first loss value by applying, to the first output image, a generalized dice loss (GDL) loss function;
    calculating a second loss value by applying, to the second output image, a Mean Square Error (MSE) loss function regularized by a total variation of the second output image; and
    modifying parameters of the U-net CNN based on the first loss value and the second loss value.

10. A system comprising:
    processing circuitry; and
    a computer-readable storage medium coupled to the at least one processor, the computer-readable storage medium configured to store instructions that configure the processing circuitry to:
        obtain input data, the input data comprising at least one a hologram of a 3-dimensional (3D) particle field, a depth map of the 3D particle field, or a maximum phase projection of the 3D particle field; and
        apply a U-net convolutional neural network (CNN) to the input data to generate output data, wherein:
            the U-net CNN comprises a set of one or more encoder blocks and a set of one or more decoder blocks,
            for each respective encoder block of the set of encoder blocks, the respective encoder block has a residual connection between a first layer of the respective encoder block and a second layer of the respective encoder block that skips over a convolution layer of the respective encoder block between the first layer of the respective encoder block and the second layer of the respective encoder block,
            for each respective decoder block of the set of decoder blocks, the respective decoder block has a residual connection between a first layer of the respective decoder block and a second layer of the respective decoder block that skips over a convolution layer of the respective decoder block between the first layer of the respective decoder block and the second layer of the respective decoder block,
            output of a last-occurring encoder block of the set of encoder blocks is input to a first-occurring decoder block of the set of decoder blocks, and
            the output data includes a first output image and a second output image, the first output image comprising a channel in which pixel intensity corresponds to relative depth of particles in the 3D particle field, and the second output image indicating locations of centroids of the particles in the 3D particle field.

11. The system of claim 10, wherein the processing circuitry is configured such that, as part of applying the U-net CNN, the processing circuitry:
    for each respective encoder block of the set of encoder blocks, applies a Swish activation function between layers of the respective encoder block; and
    applies the Swish activation function between each layer of each decoder block of the set of decoder blocks aside from before a last layer of a last decoder block of the set of decoder blocks.

12. The system of claim 11, wherein the processing circuitry is configured such that, as part of applying the U-net CNN, the processing circuitry:
    applies a Sigmoid activation function before the last layer of the last decoder block of the set of decoder blocks.

13. The system of claim 10, wherein the processing circuitry is further configured to generate the depth map and maximum phase projection from the hologram.

14. The system of claim 10, wherein the processing circuitry is further configured to train the U-net CNN, wherein the processing circuitry is configured such that, as part of training the U-net CNN, the processing circuitry:
    calculates a first loss value by applying, to the first output image, a Huber loss function; and
    calculates a second loss value by applying, to the second output image, a Mean Square Error (MSE) loss function regularized by a total variation of the second output image; and
    modifies parameters of the U-net CNN based on the first loss value and the second loss value.

15. The system of claim 10, further comprising an imaging apparatus configured to generate the hologram of the 3D particle field.

16. An imaging system comprising:
processing circuitry; and
a computer-readable storage medium coupled to the at least one processor, the computer-readable storage medium configured to store instructions that configure the processing circuitry to:
  obtain input data, the input data comprising a hologram, a depth map of the 3D particle field, and a maximum phase projection of the 3D particle field; and
  apply a U-net convolutional neural network (CNN) to the input data to generate output data, wherein:
    the U-net CNN comprises a set of one or more encoder blocks and a set of one or more decoder blocks,
    for each respective encoder block of the set of encoder blocks, the respective encoder block has a residual connection between a first layer of the respective encoder block and a second layer of the respective encoder block that skips over a convolution layer of the respective encoder block between the first layer of the respective encoder block and the second layer of the respective encoder block,
    for each respective decoder block of the set of decoder blocks, the respective decoder block has a residual connection between a first layer of the respective decoder block and a second layer of the respective decoder block that skips over a convolution layer of the respective decoder block between the first layer of the respective decoder block and the second layer of the respective decoder block,
    output of a last-occurring encoder block of the set of encoder blocks is input to a first-occurring decoder block of the set of decoder blocks, and
    the output data includes a first output image and a second output image, the first output image comprising a channel in which pixel intensity corresponds to relative depth of particles in the 3D particle field, and the second output image indicating locations of centroids of the particles in the 3D particle field.

17. The system of claim 16, wherein the processing circuitry is configured such that, as part of applying the U-net CNN, the processing circuitry:
  for each respective encoder block of the set of encoder blocks, applies a Swish activation function between layers of the respective encoder block; and
  applies the Swish activation function between each layer of each decoder block of the set of decoder blocks aside from before a last layer of a last decoder block of the set of decoder blocks.

18. The system of claim 17, wherein the processing circuitry is configured such that, as part of applying the U-net CNN, the processing circuitry:
  applies a Sigmoid activation function before the last layer of the last decoder block of the set of decoder blocks.

19. The system of claim 16, wherein the processing circuitry is further configured to train the U-net CNN, wherein the processing circuitry is configured such that, as part of training the U-net CNN, the processing circuitry:
  calculate a first loss value by applying, to the first output image, a generalized dice loss (GDL) loss function;
  calculates a second loss value by applying, to the second output image, a Mean Square Error (MSE) loss function regularized by a total variation of the second output image;
  modifies parameters of the U-net CNN based on the first loss value and the second loss value.

20. The system of claim 16, further comprising an imaging apparatus configured to generate the hologram of the 3D particle field.

* * * * *